United States Patent
Song et al.

(10) Patent No.: US 11,725,150 B2
(45) Date of Patent: *Aug. 15, 2023

(54) METHOD OF LIGHT OIL DESULFURIZATION IN THE PRESENCE OF METHANE CONTAINING GAS ENVIRONMENT AND CATALYST STRUCTURE

(71) Applicant: Kara Technologies Inc., Calgary (CA)

(72) Inventors: Hua Song, Calgary (CA); Hao Xu, Calgary (CA); Zhaofei Li, Calgary (CA); Yimeng Li, Calgary (CA)

(73) Assignee: KARA TECHNOLOGIES INC., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/404,054

(22) Filed: Aug. 17, 2021

(65) Prior Publication Data

US 2022/0055022 A1    Feb. 24, 2022

Related U.S. Application Data

(60) Provisional application No. 63/066,855, filed on Aug. 18, 2020.

(51) Int. Cl.
| | |
|---|---|
| C10G 29/04 | (2006.01) |
| C10G 45/24 | (2006.01) |
| B01J 23/883 | (2006.01) |
| B01J 37/08 | (2006.01) |
| B01J 21/06 | (2006.01) |
| B01J 29/44 | (2006.01) |
| B01J 29/48 | (2006.01) |
| C10G 29/16 | (2006.01) |

(52) U.S. Cl.
CPC ............ *C10G 29/04* (2013.01); *B01J 21/063* (2013.01); *B01J 23/883* (2013.01); *B01J 29/44* (2013.01); *B01J 29/48* (2013.01); *B01J 37/088* (2013.01); *C10G 29/16* (2013.01); *C10G 45/24* (2013.01); *C10G 2300/1011* (2013.01); *C10G 2300/1044* (2013.01); *C10G 2300/1055* (2013.01); *C10G 2300/202* (2013.01); *C10G 2300/4006* (2013.01); *C10G 2300/4012* (2013.01); *C10G 2300/4018* (2013.01); *C10G 2400/30* (2013.01)

(58) Field of Classification Search
CPC ........ C10G 29/04; C10G 29/16; C10G 29/20; C10G 45/06–12; C10G 45/24
See application file for complete search history.

(56) References Cited

U.S. PATENT DOCUMENTS

| | | |
|---|---|---|
| 3,471,412 A | 10/1969 | Miale et al. |
| 5,116,794 A | 5/1992 | Skeels et al. |
| 5,536,895 A | 7/1996 | Nair et al. |
| 5,770,047 A | 6/1998 | Salazar et al. |
| 6,051,520 A * | 4/2000 | Wu .......................... B01J 29/40 502/64 |
| 6,579,444 B2 | 6/2003 | Feimer et al. |
| 8,066,869 B2 | 11/2011 | Nicolaus et al. |
| 8,092,766 B2 | 1/2012 | Ghorishi et al. |
| 8,444,725 B2 | 5/2013 | Agrawal |
| 8,841,231 B2 | 9/2014 | Fecant |
| 2003/0134745 A1 | 7/2003 | Park |
| 2009/0288990 A1 | 11/2009 | Xie et al. |
| 2010/0299990 A1 | 12/2010 | Aradi |
| 2018/0100107 A1 * | 4/2018 | Alhooshani .......... B01J 29/0341 |
| 2018/0142159 A1 | 5/2018 | Kumar et al. |
| 2018/0171244 A1 * | 6/2018 | Harandi ................. C10G 65/14 |
| 2018/0265787 A1 | 9/2018 | Ravishankar et al. |
| 2018/0298294 A1 | 10/2018 | Magrini |
| 2019/0366310 A1 | 12/2019 | Monguillon et al. |
| 2020/0261894 A1 | 8/2020 | Song et al. |

FOREIGN PATENT DOCUMENTS

| | | |
|---|---|---|
| CN | 2645080 Y | 9/2004 |
| CN | 1552802 A | 12/2004 |
| CN | 1598568 A | 3/2005 |
| CN | 103933995 A | 7/2014 |
| CN | 104056658 A | 9/2014 |
| CN | 104069852 A | 10/2014 |
| CN | 104096571 A | 10/2014 |
| CN | 104907076 A | 9/2015 |
| CN | 205603525 U | 9/2016 |
| CN | 205603535 U | 9/2016 |

(Continued)

OTHER PUBLICATIONS

He, P., Xiao, Y., Tang, Y., Zhang, J., Song, H.*, "Simultaneous Low-Cost Carbon Sources and CO2 Valorizations through Catalytic Gasification", Energy & Fuels, (2015) 29 (11), 7497-7507 (NPL25).
He, P., Jarvis, J., Liu, L., Song, H.*, "The promoting effect of Pt on the co-aromatization of pentane with methane and propane over Zn-Pt/HZSM-5", Fuel (2019) 239, 946-954 (NPL16).
Meng et al., "Non-thermal plasma assisted catalytic reforming of naphtha and its model compounds with methane at near ambient conditions", Applied Catalysis B: Environmental (2021), 11 pages (NPL116).
Hao Xu et al., "Methane-assisted waste cooking oil conversion for renewable fuel production", Science Direct (2022), 9 pages (NPL117).
Jarvis et al., "Inhibiting the Dealkylation of Basic Arenes during n-Alkane Direct Aromatization Reactions and Understanding the C6 Ring Closure Mechanism", ACS Catalysis (2020), pp. 8428-8443 (NPL118).

(Continued)

*Primary Examiner* — Renee Robinson
(74) *Attorney, Agent, or Firm* — Edell, Shapiro & Finnan, LLC

(57) ABSTRACT

Catalyst structures and corresponding methods are described for the desulfurization of sulfur-containing light oil or model compounds under a specified gas atmosphere. The sulfur-containing feedstock is effectively converted while producing valuable hydrocarbon products such as BTX and carbon disulfide, as well as utilizing methane or natural gas resources, providing an economical and environmental innovation in the petroleum industry.

14 Claims, No Drawings

(56) References Cited

FOREIGN PATENT DOCUMENTS

| | | |
|---|---|---|
| CN | 205627574 U | 10/2016 |
| CN | 205628890 U | 10/2016 |
| CN | 107029780 A | 8/2017 |
| CN | 107418619 A | 12/2017 |
| GB | 2314089 A | 12/1997 |
| RU | 2005119994 | 4/2007 |
| WO | 2016196517 A1 | 12/2016 |
| WO | 2017051260 A1 | 3/2017 |
| WO | 2020170042 A1 | 8/2020 |

OTHER PUBLICATIONS

Hao Xu et al., "Highly selective skeletal isomerization of cyclohexene over zeolite-based catalysts for high-purity methylcyclopentene production", communications chemistry (2021), 9 pages (NPL119).

Zhaofei Li, et al., "Effect of methane presence on catalytic heavy oil partial upgrading", ScienceDirect (2021), 8 pages (NPL120).

Hoa Xu et al., "Catalytic vacuum residue upgrading under methane: Evaluation of process feasibility, stability and versatility", ScienceDirect (2022), 8 pages (NPL121).

Yimeng Li et al., "Catalytic methanotreating of vegetable oil: A pathway to Second-generation biodiesel", ScienceDirect (2022), 8 pages (NPL122).

Yimeng Li et al., Catalytic desulfurization of marine gas oil and marine diesel oil under methane environment, ScienceDirect (2021) 6 pages (NPL123).

Hao Xu et al., "Catalytic asphaltene upgrading under methane environment: Solvent effect and its interaction with oil components", ScienceDirect, (2021) 7 pages (NPL124).

Wenping Li et al., "The function of porous working electrodes for hydrogen production from water splitting in non-thermal plasma reactor", ScienceDirect (2022), 9 pages (NPL125).

Hoa Xu et al., "Organic solid waste upgrading under natural gas for valuable liquid products formation: Pilot demonstration of a highly integrated catalytic process", ScienceDirect (2022), 10 pages (NPL126).

Hao Xu et al., "The interactive role of methane beyond a reactant in crude oil upgrading", communications chemistry (2021), 12 pages (NPL127).

Shan, W., Song, H.*, "Catalysts for the Selective Catalytic Reduction of NOx with NH3 at Low Temperature", Catalysis Science & Technology, (2015) 5, 4280-4288 (NPL41).

Song, H., Zhang, L., Ozkan, U.S., "The Effect of Surface Acidic and Basic Properties on the Performance of Cobalt-Based Catalysts for Ethanol Steam Reforming", Topics in Catalysis, (2012) 55 (19-20), 1324-1331 (NPL56).

Song, H.; Shan, W.; Xiao, Y.; Cheng, W. "Catalytic biomass pyrolysis under methane-rich gas for upgraded bio-oil production", 65th Canadian Chemical Engineering Conference, Calgary, AB, Oct. 2015 (NPL112).

Song, H.*, Meng, S., Wang, A., He, P., "Catalytic Methane Valorization at Mild Conditions through Coupling Effect", 69th Canadian Chemical Engineering Conference, Halifax, NS, Oct. 2019 (Invited keynote) (NPL93).

Song, Hua "Catalytic low cost carbon resources pyrolysis under natural gas for upgraded oil production" Mar. 2014 Conference: 247th National Spring Meeting of the American-Chemical-Society (ACS), vol. 247 (NPL114).

Song, H.; Guo, A.; Wu, C.; Zhang, D.; Luan, Y.; Zhao, L. "Catalytic heavy crude oil upgrading using natural gas", 249th ACS National meeting, Denver, CO, Mar. 2015 (NPL109).

Song, H.*; Zhao, L.; He, P. "Catalytic Bitumen Partial Upgrading Under Methane Environment", 2016 AICHE National Meeting, San Francisco, CA, Nov. 2016 (NPL95).

Wang, A., He, P., Song, H.*, "Lignin valorization", Recent Advances in Bioconversion of Lignocellulose to Biofuels and Value Added Chemicals within the Biorefinery Concept, ISBN 978-0-12-818223-9, Elsevier (2020) (NPL81).

Aiguo Wang et al., "Catalytic Upgrading of Biomass and Its Model Compounds under Methane Environment" Conference Paper, University of Calgary, 1 page (NPL128).

He, P. et al., "Catalytic Light Olefin Upgrading under Methane Environment", 254th ACS National meeting, University of Calgary, Aug. 2017, 44 pages, (NPL129).

He, P. et al., "Catalytic Upgrading of Low Cost Carbon Resources Under Methane Environment", University of Calgary, Sep. 2018, 44 pages (NPL130).

Notification of Transmittal of International Search Report & Written Opinion including International Search Report & Written Opinion for International Application No. PCT/IB2021/057564, dated Nov. 29, 2021, 14 pages (NPL131).

Notification of Transmittal of International Search Report & Written Opinion including International Search Report & Written Opinion for International Application No. PCT/IB2021/057565, dated Nov. 10, 2021, 15 pages (NPL132).

Notification of Transmittal of International Search Report & Written Opinion including International Search Report & Written Opinion for International Application No. PCT/IB2021/057789, dated Aug. 25, 2021, 13 pages (NPL133).

Official Action for Eurasian Patent Application No. 202192284 issued by the Eurasian Patent Office dated Mar. 30, 2022 with English translation, 20 pages (NPL134).

Xu et al., Communications Chemistry, vol. 4, epub. Mar. 11, 2021, Article 34 (NPL135).

Aboul-Gheit et al., Journal of Molecular Catalysis A: Chemical, vol. 245, 2006, epub. Nov. 7, 2005, pp. 167-177 (NPL136).

Notification of Transmittal of International Search Report and Written Opinion including International Search Report and Written Opinion for International Application No. PCT/IB2020/000151 dated Jul. 10, 2020, 10 pages (NPL1).

Juybar, M. et al., Conversion of methanol to aromatics over ZSM-5/11 intergrowth Zeolites and bimetallic ZN-Cu-ZSM-5/11 . . . , J.Chem. Sci (2019) 131:104, 14 pages (NPL83).

Uslamin, E.A. et al., Aromatization of ethylene over zeolite-based catalysts, Catalysis Science & Technology, Jan. 6, 2020, 10 pp. 2774-2785, 13 pages (NPL74).

Harrhy, J., Wang, A., Jarvis , J., He, P., Meng, S., Yung, M., Liu, L., Song, H., "Understanding zeolite deactivation by sulphur poisoning during direct olefin upgrading", Nature Communications Chemistry, (2019), 2, 37 (NPL12).

He, P., Song, H.*, "Catalytic Natural Gas Utilization on Unconventional Oil Upgrading", Advances in Natural Gas Emerging Technologies, ISBN 978-953-51-3433-6, Rijeka, Croatia: InTech (2017) (NPL77).

Wang, A., Austin, D., Song, H.*, "Catalytic Biomass Valorization", Biomass Volume Estimation and Valorization for Energy, ISBN 978-953-51-2937-0, Rijeka, Croatia: InTech (2017) (NPL80).

"Catalytic Hydrogen Production from Bioethanol", Bioethanol (2012) MAP Lima, Hua Song p. 255 (NPL75).

Song, H.; Ozkan, U.S. "Hydrogen Production from Steam Reforming of Bio-Ethanol over Non-Precious Metal Catalysts", 21st North American Catalysis Society Meeting, San Francisco, CA, Jun. 2009 (NPL111).

H Song, RB Watson, P Matter, D Braden, U Ozkan, "Alcohol Steam Reforming for Hydrogen Production", (2005) 2005 AIChE Annual Meeting (NPL84).

Austin, D., Wang, A., Harrhy, J., Mao, X., Zeng, H., Song, H.*, "Catalytic Aromatization of Acetone as a Model Compound for Biomass Derived Oil under Methane Environment", Catalysis Science & Technology (2018) 8, 5104-5114 (NPL3).

Austin, D.; Wang, A.; He, P.; Qian, H.; Zeng, H.; Song, H.*, "Catalytic Valorization of Biomass Derived Glycerol under Methane: Effect of Catalyst Synthesis Method", Fuel, (2018) 216, 218-226 (NPL4).

He, P., Song, H.* , "Catalytic Conversion of Biomass by Natural Gas for Oil Quality Upgrading", Industrial & Engineering Chemistry Research, (2014) 53 (41), 15862-15870 (NPL13).

He, P., Shan, W., Xiao, Y., Song, H.*, "Performance of Zn/ZSM-5 for In Situ Catalytic Upgrading of Pyrolysis Bio-oil by Methane", Topics in Catalysis, (2016) 59(1), 86-93 (NPL22).

(56) References Cited

OTHER PUBLICATIONS

Peng, H., Wang, A., He, P., Harrhy, J., Meng, S., Song, H.*, "Solvent-free catalytic conversion of xylose with methane to aromatics over Zn—Cr modified zeolite catalyst", Fuel, (2019), 253, 988-996 (NPL38).
Peng, H., Wang, A., He, P., Meng, S., Song, H.*, "One-pot direct conversion of bamboo to aromatics under methane", Fuel (2020), 267, 117196 (NPL39).
Wang, A., Austin, D., He, P., Ha, M., Michaelis, V., Liu, L., Qian, H., Zeng, H., Song, H.*, "Mechanistic Investigation on Catalytic Deoxygenation of Phenol as a Model Compound of Biocrude Under Methane", ACS Sustainable Chemistry & Engineering (2019) 7(1), 1512-1523 (NPL59).
Wang, A., Austin, D., He, P., Mao, X., Zeng, H., Song, H.*, "Direct Catalytic Co-conversion of Cellulose and Methane to Renewable Petrochemicals", Catalysis Science & Technology, (2018) 8, 5632-5645 (NPL60).
Wang, A., Austin, D., Karmakar, A., Bernard, G., Michaelis, V., Yung, M., Zeng, H., Song, H.*, "Methane Upgrading of Acetic Acid as a Model Compound for Biomass Derived Liquid over Modified Zeolite Catalyst", ACS Catalysis (2017) 7, 3681-3692 (NPL61).
Wang, A., Austin, D., Qian, H., Zeng, H., Song, H.*, "Catalytic Valorization of Furfural Under Methane Environment", ACS Sustainable Chemistry & Engineering (2018) 6 (7), 8891-8903 (NPL62).
Wang, A., Austin, D., Song, H.*, "Investigations of thermochemical upgrading of biomass and its model compounds: Opportunities for methane utilization", Fuel, (2019) 246, 443-453 (NPL63).
Wang, A., He, P., Yung, M., Zeng, H., Qian, H., Song, H.8, "Catalytic Co-Aromatization of Ethanol and Methane", Applied Catalysis B: Environmental, (2016) 198, 480-492 (NPL65).
Wang, A., Austin, D., Song, H.*, "Catalytic Upgrading of Biomass and its Model Compounds for Fuel Production", Current Organic Chemistry, (2019), 23(5), 517-529 (NPL67).
Wang, A., Song, H.*, "Maximizing the Production of Aromatic Hydrocarbons from Lignin Conversion by Coupling Methane Activation", Bioresource Technology, (2018) 268, 505-513 (NPL68).
Xiao, Y., He, P., Cheng, W., Liu, J., Shan, W., Song, H.*, "Converting Solid Wastes into Liquid Fuel using a Novel Methanolysis Process", Waste Management, (2016) 49, 304-310 (NPL69).
Guo, A., Zhou, Y., Chen, K., Xue, Z., Wang, Z., Song, H.* , "Co-processing of Vacuum Residue/Fraction Oil Blends: Effect of Fraction Oils Recycle on the Stability of Coking Feedstock", Journal of Analytical and Applied Pyrolysis (2014) 109, 109-115 (NPL10).
He, P., Chen, Y., Jarvis, J., Meng, S., Liu, L., Wen, X., Song, H.*, "Highly selective aromatization of octane over Pt-Zn/UZSM-5: The effect of Pt—Zn interaction and Pt position", ACS Applied Materials & Interfaces, (2020), DOI: 10.1021/acsami.0c07039 (NPL14).
He, P., Gatip, R., Yung, M., Zeng, H., Song, H.*, "Co-Aromatization of Olefin and Methane over Ag—Ga/ZSM-5 Catalyst at Low Temperature", Applied Catalysis B: Environmental (2017) 211, 275-288 (NPL15).
He, P., Jarvis, J., Meng, S., Li, Q., Bernard, G., Liu, L., Mao, X., Jiang, Z., Zeng, H., Michaelis, V., Song, H.*, "Co-aromatization of methane with propane over Zn/HZSM-5: The methane reaction pathway and the effect of Zn distribution", Applied Catalysis B: Environmental, (2019) 250, 99-111 (NPL17).
He, P., Jarvis, J., Meng, S., Wang A., Kou, S., Gatip, R., Yung, M., Liu, L., Song, H.*, "Co-Aromatization of Methane with Olefins: The Role of Inner Pore and External Surface Catalytic Sites", Applied Catalysis B: Environmental, (2018), 234, 234-246 (NPL18).
He, P., Meng, S., Song, Y., Liu, B., Song, H.*, "Heavy Oil Catalytic Upgrading under Methane Environment: A Small Pilot Plant Evaluation", Fuel, ( 2019), 258, 116161 (NPL21).
He, P., Wang, A., Meng, S., Bernard, G., Liu, L., Michaelis, V., Song, H.*, "Impact of Al sites on the methane co-aromatization with alkanes over Zn/HZSM-5", Catalysis Today (2019) 323, 94-104 (NPL23).

Investigation on the light alkanes aromatization over Zn and Ga modified HZSM-5 catalysts in the presence of methane, Q Li, F Zhang, J Jarvis, P He, M Yung, A Wang, K Zhao, H Song (2018) Fuel 219, 331-339 (NPL27).
Jarvis, J., Harrhy, J., He, P., Wang, A., Liu, L., Song, H.*, "Highly Selective Aromatization and Isomerization of n-Alkanes from Bimetallic Pt—Zn Nanoparticles Supported on a Uniform Aluminosilicate", Chemical Communications, (2019) 55, 3355-3358 (NPL28).
Jarvis, J., Wong, A., He, P., Li, Q., Song, H.*, "Catalytic aromatization of naphtha under methane environment: Effect of surface acidity and metal modification of HZSM-5", Fuel, (2018) 223, 211-221 (NPL30).
Li, Q., He, P., Jarvis, J., Bhattacharya, A., Mao, X., Wang, A., Bernard, G., Michaelis, V., Zeng, H., Liu, L., Song, H.*, "Catalytic co-aromatization of methane and heptane as an alkane model compound over Zn—Ga/ZSM-5: A mechanistic study", Applied Catalysis B: Environmental, (2018) 236, 13-24 (NPL31).
Lou, Y., He, P., Zhao, L., Song, H.8, "Highly Selective Olefin Hydrogenation: Refinery Oil Upgrading over Bifunctional PdOx/H-ZSM-5 Catalyst", Catalysis Communications, (2016) 87, 66-69 (NPL34).
Meng, S., Wang, A., He, P., Song, H.*, "Non-thermal plasma assisted photocatalytic conversion of simulated natural gas for high quality gasoline production near ambient conditions", The Journal of Physical Chemistry Letters, (2020), 11, 3877-3881 (NPL37).
Shen, Z., He, P., Wang, A., Harrhy, J., Meng, S., Peng, H., Song, H.*, "Conversion of naphthalene as model compound of polyaromatics to mono-aromatic hydrocarbons under the mixed hydrogen and methane atmosphere", Fuel (2019) 243, 469-477 (NPL42).
Shen, Z., Ke, M., Lan, L., He, P., Liang, S., Zhang, J., Song, H.8, "Active phases and reaction performance of Mo improved Ni/Al2O3 catalysts for thioetherification", Fuel, (2019) 236, 525-534 (NPL43).
Chen, G., Yuan, W., Wu, Y., Zhang, J., Song, H., Jeje, A., Song, S., Qu, C., "Catalytic aquathermolysis of heavy oil by coordination complex at relatively low temperature", Petroleum Chemistry, (2017) 57 (10), 881-884 (NPL5).
Sun, X., He, P., Gao, Z., Liao, Y., Weng, S., Zhao, Z., Song, H.*, Zhao, Z.*, "Multi-Crystalline N-doped Cu/CuxO/C Foam Catalyst Derived from Alkaline N-coordinated HKUST-1/CMC for Enhanced 4-Nitrophenol Reduction", Journal of Colloid and Interface Science, (2019), 553, 1-13 (NPL57).
Wang, A., Harrhy, J., Meng, S., He, P., Liu, L., Song, H.*, "Nonthermal Plasma-Catalytic Conversion of Biogas to Liquid Chemicals with Low Coke Formation", Energy Conversion & Management, (2019), 191, 93-101 (NPL64).
Wang, A., Meng, S., Song, H.*, "Non-thermal plasma induced photocatalytic conversion of light alkanes into high value-added liquid chemicals at near ambient conditions", Chemical Communications, (2020), 56, 5263-5266 (NPL66).
Lou, Y., He, P., Zhao, L., Cheng, W., Song, H.*, "Olefin Upgrading over Ir/ZSM-5 catalysts under methane environment", Applied Catalysis B: Environmental, (2017) 201, 278-289 (NPL33).
He, P., Lou, Y., Song, H.*, "Olefin Upgrading under Methane Environment over Ag—Ga/ZSM-5 Catalyst", Fuel, (2016), 182, 577-587 (NPL19).
Ku, H., Li, Z., Pryde, R., Meng, S., Li, Y., Song, H.*, "Participation of methane in economically and environmentally favorable catalytic asphaltene upgrading process", Chemical Communications, (2020), 56, 5492-5495 (NPL70).
Jarvis, J., He, P., Wang, A., Song, H.*, "Pt—Zn/HZSM-5 as a Highly Selective Catalyst for the Co-aromatization of Methane and Light Straight Run Naphtha", Fuel (2019) 236, 1301-1310 (NPL29).
Lou, Y., He, P., Zhao, L., Song, H.*, "Refinery Oil Upgrading under Methane Environment over PdOx/H-ZSM-5: Highly Selective Olefin Cyclization", Fuel, (2016) 183, 396-404 (NPL35).
He, P., Wen, Y., Jarvis, J., Gatip, R., Austin, D., Song, H.*, "Selective Participation of Methane in Olefin Upgrading over Pd/ZSM-5 and lr/ZSM-5: Investigation using Deuterium Enriched Methane", ChemistrySelect, (2017) 2, 252-256 (NPL24).
Guo, A., Wei, Z., Zhao, B., Chen K., Liu, D., Wang, Z., Song, H.*, "Separation of Toluene-Insoluble Solids in the Slurry Oil from a Residual Fluidized Catalytic Cracking Unit: Determination of the

(56) References Cited

OTHER PUBLICATIONS

Solid Content and Sequential Selective Separation of Solid Components", Energy & Fuels, (2014) 28 (5), 3053-3065 (NPL8).

He Peng et al., Catalytic bitumen partial upgrading over Ag—Ga/ZSM-5 under methane environment, Fuel Processing Technology, Elsevier BV, NL, vol. 156 Sep. 21, 2016, pp. 290-297, XP029825240 ossm 3378-3820, DOI: 10.1016/J.FUPROC.2016.09.010.

Extended European Search Report for European Patent Application No. 20759245.2 dated Oct. 10, 2022, 9 pages.

Notice for Reason for Rejection for Japanese Patent Application No. 2021-549183 dated Sep. 6, 2022 with English translation, 6 pages.

International Preliminary Report on Patentability for PCT/IB2021/057564, dated Feb. 16, 2023, 8 pages.

Notification of Transmittal of International Search Report and Written Opinion including International Search Report and Written Opinion for International Application No. PCT/IB2021/057565, dated Nov. 10, 2021, 15 pages.

Notification of the First Office Action from the China National Intellectual Property Administration for Chinese Patent Application No. 202080015663.4 dated Feb. 6, 2023, with English translation, 16 pages.

International Preliminary Report on Patentability for PCT/IB2021/057789, dated Feb. 28, 2023, 9 pages.

\* cited by examiner

METHOD OF LIGHT OIL DESULFURIZATION IN THE PRESENCE OF METHANE CONTAINING GAS ENVIRONMENT AND CATALYST STRUCTURE

CROSS-REFERENCE TO RELATED APPLICATIONS

The present application claims priority from U.S. Provisional Patent Application Ser. No. 63/066,855, filed Aug. 18, 2020 and entitled "Method of Light Oil Desulfurization in the Presence of Methane Containing Gas Environment and Catalyst Structure", the disclosure of which is incorporated herein by reference in its entirety.

FIELD

The present invention relates to a method for light oil quality enhancement in the field of petroleum refinery and processing.

BACKGROUND

Petroleum is one of the most important natural occurring resources, which plays an important role in the basic demands of daily life, especially in the production of various fuels and chemicals. It generally consists of different types of hydrocarbons, and also contains heteroatoms including nitrogen, oxygen, sulfur and other metals. The sulfur content in crude petroleum oils could be as high as 6 wt %, and therefore the derived light oils often have relatively high sulfur content. The use of such oil can give rise to a variety of problems. For instance, the use of high sulfur content fuels can lead to severe sulfur oxide ($SO_x$) emission and exacerbate the deterioration of the ecosystem by generating toxic radicals and acid rains. High sulfur content is also a large concern in chemical processing practices, specifically due to the challenges associated with catalyst poisoning, equipment corrosion, safety hazards and environmental pollution. Therefore, the removal of sulfur heteroatoms in crude oils is necessary and compulsory before downstream applications.

The regulation regarding sulfur content in oil products becomes increasingly more stringent. For instance, in North America, ultralow sulfur diesel with a maximum of 15 ppm sulfur has been the norm since 2006 for on-road vehicles, 2010 for non-road vehicles and 2012 for locomotives and marine vessels. From January 2017, the sulfur content in gasoline is further limited to an average of 10 ppm. Moreover, a new regulation of marine sulfur emission has been mandated from 1 Jan. 2020 decided by the Marine Environment Protection Committee (MEPC 70) of the International Maritime Organization (IMO) in October 2016. The new sulfur limit forces ships to use the fuel oil outside designated emission control areas with no more than 0.5 wt % sulfur content, which is much lower than the previous limit of 3.5 wt %. It is evident that the desulfurization process is necessary before the fuels can be sold in the market.

The traditional desulfurization process for light oils mainly uses $H_2$ as the reactant and is thus called hydrodesulfurization (HDS). In industry, the HDS reaction takes place in a fixed-bed reactor at relatively high temperatures ranging from 300 to 400° C. and high pressures ranging from 30 to 130 bar, typically in the presence of a catalyst consisting of alumina impregnated with cobalt and molybdenum. The molybdenum center can stabilize a coordinately unsaturated site. Sulfur-containing substrates can bind to this site and undergo a series of reactions which result in both C—S scission and C═C hydrogenation. In this process, hydrogen is used as a reductant and sulfur atoms in the feedstock oil can be effectively converted into hydrogen sulfide ($H_2S$) in the reactor (the reactor is generally referred to as a hydrotreater). Then, $H_2S$ needs to be separated from other gaseous hydrocarbon species and sent into a gas processing unit to produce elemental sulfur or sulfuric acid. However, hydrogen is mainly produced by a methane steam reforming process known in the industry. This process generally needs high temperature and pressure, resulting in high capital investment and operation costs plus high energy and water consumption, therefore it is economically unfavorable. Besides, $CO_2$ is directly produced in the process, leading to more greenhouse gas emissions and adverse environmental impacts. Moreover, the excessive elemental sulfur produced from refineries and other hydrocarbon processing plants becomes an intractable waste for further utilization. Therefore, an alternative pathway for oil desulfurization, which can overcome the abovementioned drawbacks, is of great value and urgency.

Methane is the main component in natural gas, which is a naturally occurring resource with underestimated values. It is also witnessed that the production of natural gas has rocketed in the past decades mainly due to the so-called shale gas revolution in North America while the price is decreasing continuously. If methane or natural gas can be utilized as a hydrogen donor for oil desulfurization to produce high-value low sulfur content products, not only the process can be more environmentally and economically friendly, but also the added value of natural gas can be greatly enhanced, which is highly beneficial and profitable for current petroleum and natural gas industry. Besides, if other valuable sulfur-containing products rather than hydrogen sulfide can be generated, the relevant safety concerns and unwilling production of elemental sulfur can also be mitigated. Therefore, the whole process can be more economically attractive and competitive.

BRIEF SUMMARY

In accordance with the embodiments described herein, a catalyst structure comprises a porous support structure including an aluminum oxide (i.e., $Al_2O_3$), an aluminosilicate material (e.g. zeolite), a silicon oxide (i.e. $SiO_2$), a silicon carbide (i.e. SiC), a titanium oxide (i.e. $TiO_2$) and any two or more metals loaded in the porous support structure. The two or more metals are selected from the group consisting of Ni, Mo, Co, Ga, Ag, Zn and Ce. Each metal loaded in the porous support structure is present in an amount from about 0.1 wt % to about 20 wt %.

Further, in the following embodiments, a process of forming the catalyst structure is provided.

Further, in the following embodiments, a method for the desulfurization of light oil (such as marine diesel oil, FCC diesel, renewable diesel, FCC gasoline and coker naphtha) or corresponding model compounds (such as thiophene, benzothiophene, dibenzothiophene, organic sulfide and their derivatives), or a mixture thereof, in the presence of the catalyst structure and specific gas environment is described herein, which can effectively lower the sulfur content of the feedstock with simple process operation.

The implementation of the embodiments can further result in advantageous properties of products including but not limited to: increase in light distillate content, decrease in coke content, decrease in density, decrease in viscosity, decrease in TAN (total acid number), increase in aromatic content (especially the content of benzene, toluene and xylenes), increase in overall hydrogen to carbon ratio (H/C mole ratio), etc.

The above and still further features and advantages of the present invention will become apparent upon consideration of the following detailed description of specific embodiments thereof.

DETAILED DESCRIPTION

The present invention is directed toward the formulation of a heterogeneous catalyst and a process of utilizing the catalyst for light oil desulfurization under methane or natural gas environment for decreasing the sulfur content of such oil feedstock while also producing high value-added chemicals such as carbon disulfide, benzene, toluene and xylenes.

In particular, described herein are methods of desulfurization of light oils or corresponding model compounds under a methane or natural gas environment. For example, light oils as described herein can be crude oils having an API gravity of 31.1° API or higher, and further having a dynamic viscosity of less than $2 \times 10^3$ cP (mPa·s). Some non-limiting examples of light oils that can be upgraded as described herein by desulfurization as well as producing desirable chemicals in the upgrading process include marine diesel oil, FCC diesel, renewable diesel, FCC gasoline and coker naphtha) and/or corresponding model compounds (such as thiophene, benzothiophene, dibenzothiophene, organic sulfide and their derivatives).

It is observed that methane can be effectively activated, which facilitates the desulfurization process. In addition, other chemicals such as carbon disulfide ($CS_2$) and BTX (benzene, toluene and xylenes) can be generated, which can be further utilized as solvents or intermediates in chemistry. This method provides a transformational way for oil desulfurization in the petroleum industry.

In the following detailed description, while aspects of the disclosure are disclosed, alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure, are synonymous.

In accordance with example embodiments, catalyst structures are described herein for use in the combination with processes for oil desulfurization utilizing methane or natural gas resources and one or more of such catalyst structures to achieve a product with lower sulfur content.

The use of methane or natural gas, rather than hydrogen, in the oil desulfurization process obviates the need for an economically unfavorable hydrotreating step at high pressures and temperatures. The design of the catalyst so as to activate methane and sulfur-containing species and selectively form desired products is very important to the efficacy of the process. Particularly, the catalyst structures described herein facilitate the oil desulfurization process in the presence of methane or natural gas at low temperatures (e.g., in the range of 350-450° C., preferably at around 400° C.) and pressures (e.g., in the range of 1-50 atm, preferably at 30 atm) and in the presence of catalyst structures.

Catalyst Structures

In accordance with the present invention, a catalyst structure is provided that comprises one or a combination of mono or multi-metallic (e.g., bimetallic) active components loaded on highly porous supports for oil desulfurization in methane or natural gas environment. It is noted that the catalyst structures described herein can also be used for sulfur removal in other gas environments such as $H_2$, He and $N_2$ environments, although utilizing methane or natural gas environment is preferred.

The catalyst structure can be synthesized by impregnating or doping a suitable support material with two or more metals. Suitably porous support material can be an aluminum oxide (i.e., $Al_2O_3$), an aluminosilicate (e.g. zeolite), a silicon oxide (i.e. $SiO_2$), a titanium oxide (i.e. $TiO_2$) or a silicon carbide (i.e. SiC). Some non-limiting examples of a suitable zeolite material as a support material for the catalyst structure include HZSM-5 type zeolite, L-type zeolite, HX type zeolite, HY type zeolite and a zeolite structure commercially available from Rive Technology (Monmouth Junction, N.J.). An ammonium type zeolite can also be utilized by conversion to a hydrogen type zeolite (e.g., by calcination in static air at a temperature of about 400-600° C. for a period of about 4-6 hours). When utilizing a zeolite material as the support material, a $SiO_2$ to $Al_2O_3$ ratio of the zeolite support material can be in the range of 2.5-280 (i.e., a ratio of $SiO_2$ to $Al_2O_3$ that is in the range of 2.5:1 to 280:1).

Suitable metals that can be loaded on the porous support material by impregnation or doping include any one or more (e.g., any two or more) from the following group: molybdenum (Mo), nickel (Ni), cobalt (Co), silver (Ag), gallium (Ga), zinc (Zn), and cerium (Ce). Each metal dopant or the combination of metal dopants can be provided within the catalyst structure in an amount ranging from 0.1-20 wt % (i.e., based upon the total weight of the catalyst structure). Specific examples are provided herein of different metal loadings for catalyst structures.

The porous support material can be doped with a suitable amount of one or more metals in the following manner. One or more metal salts can be dissolved in deionized water to form an aqueous solution at the suitable concentration(s) within the solution. Metal precursor salts that can be used to form the catalyst structure include, without limitation, chlorides, nitrates, sulfates, sulfides and polythiometalates. The one or more metal precursors in solution are then loaded into the porous support material to achieve a desired amount of metals within the catalyst structure (e.g., from 0.1-20 wt %). Any suitable loading process can be performed to load metals within the porous support material. Some non-limiting examples of metal loading processes include: IWI (incipient wetness impregnation, where an active metal precursor is first dissolved in an aqueous or organic solution, the metal-containing solution is then added to a catalyst support containing the same pore volume as the added solution volume, where capillary action draws the solution into the pores); WI (wet impregnation, where more liquid than the IWI volume is added to the support, and the solvent is then removed by evaporation); IE (ion-exchange, where metal cations are exchanged into the support from solution); and FI (framework incorporation, where metals are added to the support materials during the synthesis step of the support).

Depending upon the particular loading process, the resultant metal-loaded catalyst structure can be dried at a temperature between about 80° C. to about 120° C. for a period of time between about 2 hours to about 24 hours. The dried catalyst structure can then be calcined under air, $N_2$ or He gas at a temperature ranging from 300-700° C. and at a suitable ramped or stepwise increased heating rate (e.g., the heating rate at about 5-20° C./min), where such calcination temperatures, times and heating rates can be modified depending upon the type or types of metals doped into the catalyst structure as well as reaction conditions associated with the use of the catalyst structure.

The resultant metal-doped catalyst structure is suitable for use in oil desulfurization under methane or natural gas environment in processes as described herein. The catalyst structure can be processed into a granular form with a granule size desired for a particular operation. The catalyst structure can also be formed into any other suitable configuration. For example, the catalyst structure in a powder form can be utilized in a batch reactor system, while the catalyst structure in a pelleted form can be utilized in a continuous flow reactor system.

Systems and Methods for Oil Desulfurization Utilizing the Catalyst Structures

The conversion of sulfur-containing species and selectivity towards valuable hydrocarbon products such as aromatics, especially benzene, toluene and xylenes can be fine-tuned using catalyst structures as described herein and under methane or natural gas environment. Different reactor systems and modified operating conditions (e.g., temperatures and pressures), as well as modifications of the catalyst structures within the reactor systems, can also be implemented to achieve varied product compositions. For example, when utilizing a batch reactor, a mass ratio of sulfur-containing feedstock to catalyst structure within the reactor can be within the range of about 50:1 to about 1:10. When utilizing a continuous reactor, a liquid hourly space velocity (LHSV) of the sulfur-containing feedstock can be within the range of about 0.1 $h^{-1}$ to about 10 $h^{-1}$. In addition, the reactor system can comprise one or a combination of a batch reactor system, a continuous tubular reactor (CTR), and a semi-batch reactor.

Methane, as a main component in natural gas, is particularly useful for oil desulfurization in the presence of catalysts described herein. Methane is typically regarded as chemically inert due to its stable structure, and methane activation has been a challenge in natural gas utilization. However, it has been validated that methane utilization can be significantly enhanced with the assistance of the catalysts aforementioned.

The desulfurization process as described herein further minimizes the generation of $CO_2$. In particular, methane desulfurization utilizing the catalyst structures as described herein can result in the generation or production of $CO_2$ that is less than 5% by weight of the oil product, in some scenarios less than 3% by weight, or even less than 1% by weight (e.g., substantially no $CO_2$ is formed in the process).

Some examples of desulfurizing sulfur-containing feedstocks using the aforementioned catalyst structure and process are now described.

Example 1

10 wt % Mo-1.25 wt % Ni—$TiO_2$—S catalyst (MDS1) was prepared in the following manner. A $TiO_2$ (P25, average particle size 21 nm) support structure in powder form obtained from Sigma-Aldrich was used without further treatment. The metal salts nickel nitrate ($Ni(NO_3)_2.6H_2O$) and ammonium tetrathiomolybdate ($(NH_4)_2MoS_4$) was dissolved in deionized water to form a precursor solution. The $TiO_2$ support was impregnated with the metal precursor solution to achieve a suitable metal weight loading. The obtained wet powder was first dried in an oven at 100° C. overnight, followed by calcination at 350° C. in a nitrogen atmosphere for 2 hours with a nitrogen flow rate of 100 mL/min.

1 g dibenzothiophene (DBT), which is a model compound representing thiophenic sulfur species in diesel oil, was put in a 100 mL batch reactor. The catalyst was added and mechanical mixing was practiced. The reaction was carried out under 400° C. and a gas atmosphere of 32 atm $CH_4$ and 3 atm $N_2$. The weight ratio of DBT to catalyst was 5:1 and the reaction lasted 1 hour. The gas product was collected in air bags, and the soluble product was extracted by solvent 1,1,2,2-tetrachloroethane and separated from the solid product through filtration. DBT conversion, methane conversion, gas yield, soluble yield, coke yield and overall mass balance were measured and listed in Table 1. The composition of gas products is listed in Table 2. In addition, soluble products were also analyzed and the product distribution is listed in Table 3.

Example 2

1 wt % Ag-1 wt % Ga-5 wt % Ce/HZSM-5(23:1) catalyst (MAC1) was prepared in the following manner. An $NH_4$-ZSM-5 ($SiO_2$:$Al_2O_3$ molar ratio of 23:1) support structure in powder form obtained from Zeolyst USA was calcined in static air at 600° C. for 3 hours. The following metal salts were dissolved in deionized water to form a metal precursor solution: $Ce(NO_3)_3.6H_2O$, $Ga(NO_3)_3.9H_2O$ and $AgNO_3$. The HZSM-5 support was impregnated with the metal precursor solution to achieve a suitable metal weight loading. The obtained wet powder was first dried in an oven at 100° C. overnight, followed by calcination at 550° C. for 4 hours in static air.

1 g dibenzothiophene (DBT), which is a model compound representing thiophenic sulfur species in diesel oil, was put in a 100 mL batch reactor. The catalyst was added and mechanical mixing was practiced. The reaction was carried out under 400° C. and a gas atmosphere of 32 atm $CH_4$ and 3 atm $N_2$. The weight ratio of DBT to catalyst was 5:1 and the reaction lasted 1 hour. The gas product was collected in air bags, and the soluble product was extracted by solvent 1,1,2,2-tetrachloroethane and separated from the solid product through filtration. DBT conversion, methane conversion, gas yield, soluble yield, coke yield and overall mass balance were measured and listed in Table 1. Besides, the composition of gas products is listed in Table 2. Moreover, soluble products were also analyzed and the product distribution is listed in Table 3.

Example 3

10 wt % Mo-1.25 wt % Ni—$TiO_2$—S catalyst (MDS1) was prepared in the following manner. A $TiO_2$ (P25, average particle size 21 nm) support structure in powder form obtained from Sigma-Aldrich was used without further treatment. The metal salts nickel nitrate ($Ni(NO_3)_2 \cdot 6H_2O$) and ammonium tetrathiomolybdate (($NH_4)_2MoS_4$) was dissolved in deionized water to form a precursor solution. The $TiO_2$ support was impregnated with the metal precursor solution to achieve a suitable metal weight loading. The obtained wet powder was first dried in an oven at 100° C. overnight, followed by calcination at 350° C. in a nitrogen atmosphere for 2 hours with a nitrogen flow rate of 100 mL/min.

1 wt % Ag-1 wt % Ga-5 wt % Ce/HZSM-5(23:1) (MAC1) catalyst was prepared in the following manner. An $NH_4$-ZSM-5 ($SiO_2$:$Al_2O_3$ molar ratio of 23:1) support structure in powder form obtained from Zeolyst USA was calcined in static air at 600° C. for 3 hours. The following metal salts were dissolved in deionized water to form a metal precursor solution: $Ce(NO_3)_3 \cdot 6H_2O$, $Ga(NO_3)_3 \cdot 9H_2O$ and $AgNO_3$. The HZSM-5 support was impregnated with the metal precursor solution to achieve a suitable metal weight loading. The obtained wet powder was first dried in an oven at 100° C. overnight, followed by calcination at 550° C. for 4 hours in static air.

1 g dibenzothiophene (DBT), which is a model compound representing thiophenic sulfur species in diesel oil, was put in a 100 mL batch reactor. The 10 wt % Mo-1.25 wt % Ni—$TiO_2$—S catalyst and the 1 wt % Ag-1 wt % Ga-5 wt % Ce/HZSM-5(23:1) catalyst were added and mechanical mixing was practiced. The reaction was carried out under 400° C. and a gas atmosphere of 32 atm $CH_4$ and 3 atm $N_2$. The weight ratio of DBT to each catalyst was 5:1 and the reaction lasted 1 hour. The gas product was collected in air bags, and the soluble product was extracted by solvent 1,1,2,2-tetrachloroethane and separated from the solid product through filtration. DBT conversion, methane conversion, gas yield, soluble yield, coke yield and overall mass balance were measured and listed in Table 1. Besides, the composition of gas products is listed in Table 2. Moreover, soluble products were also analyzed and the product distribution is listed in Table 3.

Example 4

10 wt % Mo-1.25 wt % Ni—$TiO_2$—S catalyst (MDS1) was prepared in the following manner. A $TiO_2$ (P25, average particle size 21 nm) support structure in powder form obtained from Sigma-Aldrich was used without further treatment. The metal salts nickel nitrate ($Ni(NO_3)_2 \cdot 6H_2O$) and ammonium tetrathiomolybdate (($NH_4)_2MoS_4$) was dissolved in deionized water to form a precursor solution. The $TiO_2$ support was impregnated with the metal precursor solution to achieve a suitable metal weight loading. The obtained wet powder was first dried in an oven at 100° C. overnight, followed by calcination at 350° C. in a nitrogen atmosphere for 2 hours with a nitrogen flow rate of 100 mL/min.

1 wt % Ag-1 wt % Ga-5 wt % Ce/HZSM-5(23:1) catalyst (MAC1) was prepared in the following manner. An $NH_4$-ZSM-5 ($SiO_2$:$Al_2O_3$ molar ratio of 23:1) support structure in powder form obtained from Zeolyst USA was calcined in static air at 600° C. for 3 hours. The following metal salts were dissolved in deionized water to form a metal precursor solution: $Ce(NO_3)_3 \cdot 6H_2O$, $Ga(NO_3)_3 \cdot 9H_2O$ and $AgNO_3$. The HZSM-5 support was impregnated with the metal precursor solution to achieve a suitable metal weight loading. The obtained wet powder was first dried in an oven at 100° C. overnight, followed by calcination at 550° C. for 4 hours in static air.

1 g dibenzothiophene (DBT), which is a model compound representing thiophenic sulfur species in diesel oil, was put in a 100 mL batch reactor. The 10 wt % Mo-1.25 wt % Ni—$TiO_2$—S catalyst and the 1 wt % Ag-1 wt % Ga-5 wt % Ce/HZSM-5(23:1) catalyst were added and mechanical mixing was practiced. The reaction was carried out under 400° C. and a gas atmosphere of 35 atm $N_2$. The weight ratio of DBT to each catalyst was 5:1 and the reaction lasted 1 hour. The gas product was collected in air bags, and the soluble product was extracted by solvent 1,1,2,2-tetrachloroethane and separated from the solid product through filtration. DBT conversion, methane conversion, gas yield, soluble yield, coke yield and overall mass balance were measured and listed in Table 1. Besides, the composition of gas products is listed in Table 2. Moreover, soluble products were also analyzed and the product distribution is listed in Table 3.

Example 5

A commercial silicon carbide from Sigma-Aldrich with a specific surface area of 10 $m^2/g$ was used as the catalyst without further purification. 1 g dibenzothiophene (DBT), which is a model compound representing thiophenic sulfur species in diesel oil, was put in a 100 mL batch reactor. The reaction was carried out under 400° C. and a gas atmosphere of 32 atm $CH_4$ and 3 atm $N_2$. The weight ratio of DBT to catalyst was 5:1 and the reaction lasted 1 hour. The gas product was collected in air bags, and the soluble product was extracted by solvent 1,1,2,2-tetrachloroethane and separated from the solid product through filtration. DBT conversion, methane conversion, gas yield, soluble yield, coke yield and overall mass balance were measured and listed in Table 1. Besides, the composition of gas products is listed in Table 2. Moreover, soluble products were also analyzed and the product distribution is listed in Table 3.

Example 6

10 wt % Mo-1.25 wt % Ni—$TiO_2$—O (MDS1-O) catalyst was prepared in the following manner. A $TiO_2$ (P25, average particle size 21 nm) support structure in powder form obtained from Sigma-Aldrich was used without further treatment. The metal salts nickel nitrate ($Ni(NO_3)_2 \cdot 6H_2O$) and ammonium heptamolybdate (($NH_4)_6Mo_7O_{24} \cdot 4H_2O$) was dissolved in deionized water to form a precursor solution. The $TiO_2$ support was impregnated with the metal precursor solution to achieve a suitable metal weight loading. The obtained wet powder was first dried in an oven at 100° C. overnight, followed by calcination at 550° C. for 4 hours in static air.

1 wt % Ag-1 wt % Ga-5 wt % Ce/HZSM-5(23:1) catalyst (MAC1) was prepared in the following manner. An $NH_4$-ZSM-5 ($SiO_2$:$Al_2O_3$ molar ratio of 23:1) support structure in powder form obtained from Zeolyst USA was calcined in static air at 600° C. for 3 hours. The following metal salts were dissolved in deionized water to form a metal precursor solution: $Ce(NO_3)_3.6H_2O$, $Ga(NO_3)_3.9H_2O$ and $AgNO_3$. The HZSM-5 support was impregnated with the metal precursor solution to achieve a suitable metal weight loading. The obtained wet powder was first dried in an oven at 100° C. overnight, followed by calcination at 550° C. for 4 hours in static air.

1 g dibenzothiophene (DBT), which is a model compound representing thiophenic sulfur species in diesel oil, was put in a 100 mL batch reactor. The 10 wt % Mo-1.25 wt % Ni—$TiO_2$—O catalyst and the 1 wt % Ag-1 wt % Ga-5 wt % Ce/HZSM-5(23:1) catalyst were added and mechanical mixing was practiced. The reaction was carried out under 400° C. and a gas atmosphere of 32 atm $CH_4$ and 3 atm $N_2$. The weight ratio of DBT to each catalyst was 5:1 and the reaction lasted 1 hour. The gas product was collected in air bags, and the soluble product was extracted by solvent 1,1,2,2-tetrachloroethane and separated from the solid product through filtration. DBT conversion, methane conversion, gas yield, soluble yield, coke yield and overall mass balance were measured and listed in Table 1. Besides, the composition of gas products is listed in Table 2. Moreover, soluble products were also analyzed and the product distribution is listed in Table 3.

Example 7

10 wt % Mo-1.25 wt % Ni—$TiO_2$—S-2 (MDS2) catalyst was prepared in the following manner. A $TiO_2$ (P25, average particle size 21 nm) support structure in powder form obtained from Sigma-Aldrich was used without further treatment. The metal salts nickel nitrate ($Ni(NO_3)_2.6H_2O$) and ammonium heptamolybdate (($NH_4)_6Mo_7O_{24}.4H_2O$) was dissolved in deionized water to form a precursor solution. The $TiO_2$ support was impregnated with the metal precursor solution to achieve a suitable metal weight loading. The obtained wet powder was first dried in an oven at 100° C. overnight, followed by calcination at 550° C. for 4 hours in static air. The resultant catalyst was treated by 514 ppm ELS gas ($N_2$ balance) in a tube furnace at 400° C. for 14 h.

1 wt % Ag-1 wt % Ga-5 wt % Ce/HZSM-5(23:1) catalyst (MAC1) was prepared in the following manner. An $NH_4$-ZSM-5 ($SiO_2$:$Al_2O_3$ molar ratio of 23:1) support structure in powder form obtained from Zeolyst USA was calcined in static air at 600° C. for 3 hours. The following metal salts were dissolved in deionized water to form a metal precursor solution: $Ce(NO_3)_3.6H_2O$, $Ga(NO_3)_3.9H_2O$ and $AgNO_3$. The HZSM-5 support was impregnated with the metal precursor solution to achieve a suitable metal weight loading. The obtained wet powder was first dried in an oven at 100° C. overnight, followed by calcination at 550° C. for 4 hours in static air.

1 g dibenzothiophene (DBT), which is a model compound representing thiophenic sulfur species in diesel oil, was put in a 100 mL batch reactor. The 10 wt % Mo-1.25 wt % Ni—$TiO_2$—S-2 catalyst and the 1 wt % Ag-1 wt % Ga-5 wt % Ce/HZSM-5(23:1) catalyst were added and mechanical mixing was practiced. The reaction was carried out under 400° C. and a gas atmosphere of 32 atm $CH_4$ and 3 atm $N_2$. The weight ratio of DBT to each catalyst was 5:1 and the reaction lasted 1 hour. The gas product was collected in air bags, and the soluble product was extracted by solvent 1,1,2,2-tetrachloroethane and separated from the solid product through filtration. DBT conversion, methane conversion, gas yield, soluble yield, coke yield and overall mass balance were measured and listed in Table 1. Besides, the composition of gas products is listed in Table 2. Moreover, soluble products were also analyzed and the product distribution is listed in Table 3.

Example 8

10 wt % Mo-1.25 wt % Ni—$TiO_2$—S-3 (MDS3) catalyst was prepared in the following manner. A $TiO_2$ (P25, average particle size 21 nm) support structure in powder form obtained from Sigma-Aldrich was used without further treatment. The metal salts nickel nitrate ($Ni(NO_3)_2.6H_2O$) and ammonium heptamolybdate (($NH_4)_6Mo_7O_{24}.4H_2O$) was dissolved in deionized water to form a precursor solution. The $TiO_2$ support was impregnated with the metal precursor solution to achieve a suitable metal weight loading. The obtained wet powder was first dried in an oven at 100° C. overnight, followed by calcination at 550° C. for 4 hours in static air. The resultant catalyst was treated in a batch reaction together with carbon disulfide at 300° C. for 1 h, then put in a tube furnace and treated by 5 vol % $H_2$ gas (Ar balance) at 400° C. for 2 h.

1 wt % Ag-1 wt % Ga-5 wt % Ce/HZSM-5(23:1) catalyst (MAC1) was prepared in the following manner. An $NH_4$-ZSM-5 ($SiO_2$:$Al_2O_3$ molar ratio of 23:1) support structure in powder form obtained from Zeolyst USA was calcined in static air at 600° C. for 3 hours. The following metal salts were dissolved in deionized water to form a metal precursor solution: $Ce(NO_3)_3.6H_2O$, $Ga(NO_3)_3.9H_2O$ and $AgNO_3$. The HZSM-5 support was impregnated with the metal precursor solution to achieve a suitable metal weight loading. The obtained wet powder was first dried in an oven at 100° C. overnight, followed by calcination at 550° C. for 4 hours in static air.

1 g dibenzothiophene (DBT), which is a model compound representing thiophenic sulfur species in diesel oil, was put in a 100 mL batch reactor. The 10 wt % Mo-1.25 wt % Ni—$TiO_2$—S-3 catalyst and the 1 wt % Ag-1 wt % Ga-5 wt % Ce/HZSM-5(23:1) catalyst were added and mechanical mixing was practiced. The reaction was carried out under 400° C. and a gas atmosphere of 32 atm $CH_4$ and 3 atm $N_2$. The weight ratio of DBT to each catalyst was 5:1 and the reaction lasted 1 hour. The gas product was collected in air bags, and the soluble product was extracted by solvent 1,1,2,2-tetrachloroethane and separated from the solid product through filtration. DBT conversion, methane conversion, gas yield, soluble yield, coke yield and overall mass balance were measured and listed in Table 1. Besides, the composition of gas products is listed in Table 2. Moreover, soluble products were also analyzed and the product distribution is listed in Table 3.

Example 9

10 wt % Mo-1.25 wt % Ni—$TiO_2$—S-4 (MDS4) catalyst was prepared in the following manner. A $TiO_2$ (P25, average particle size 21 nm) support structure in powder form obtained from Sigma-Aldrich was used without further treatment. The metal salts nickel nitrate ($Ni(NO_3)_2.6H_2O$) and ammonium heptamolybdate (($NH_4)_6Mo_7O_{24}.4H_2O$) was dissolved in deionized water to form a precursor solution. The $TiO_2$ support was impregnated with the metal precursor solution to achieve a suitable metal weight loading. The obtained wet powder was first dried in an oven at 100° C. overnight, followed by calcination at 550° C. for 4 hours in static air. The resultant catalyst was treated by 1% ELS gas ($N_2$ balance) in a tube furnace at 400° C. for 1 h.

1 wt % Ag-1 wt % Ga-5 wt % Ce/HZSM-5(23:1) catalyst (MAC1) was prepared in the following manner. An $NH_4$-ZSM-5 ($SiO_2$:$Al_2O_3$ molar ratio of 23:1) support structure in powder form obtained from Zeolyst USA was calcined in static air at 600° C. for 3 hours. The following metal salts were dissolved in deionized water to form a metal precursor solution: $Ce(NO_3)_3.6H_2O$, $Ga(NO_3)_3.9H_2O$ and $AgNO_3$. The HZSM-5 support was impregnated with the metal precursor solution to achieve a suitable metal weight loading. The obtained wet powder was first dried in an oven at 100° C. overnight, followed by calcination at 550° C. for 4 hours in static air.

1 g dibenzothiophene (DBT), which is a model compound representing thiophenic sulfur species in diesel oil, was put in a 100 mL batch reactor. The 10 wt % Mo-1.25 wt % Ni—$TiO_2$—S-4 catalyst and the 1 wt % Ag-1 wt % Ga-5 wt % Ce/HZSM-5(23:1) catalyst were added and mechanical mixing was practiced. The reaction was carried out under 400° C. and a gas atmosphere of 32 atm $CH_4$ and 3 atm $N_2$. The weight ratio of DBT to each catalyst was 5:1 and the reaction lasted 1 hour. The gas product was collected in air bags, and the soluble product was extracted by solvent 1,1,2,2-tetrachloroethane and separated from the solid product through filtration. DBT conversion, methane conversion, gas yield, soluble yield, coke yield and overall mass balance were measured and listed in Table 1. Besides, the composition of gas products is listed in Table 2. Moreover, soluble products were also analyzed and the product distribution is listed in Table 3.

Example 10

10 wt % Mo-1.25 wt % Ni—$TiO_2$—S catalyst (MDS1) was prepared in the following manner. A $TiO_2$ (P25, average particle size 21 nm) support structure in powder form obtained from Sigma-Aldrich was used without further treatment. The metal salts nickel nitrate ($Ni(NO_3)_2.6H_2O$) and ammonium tetrathiomolybdate (($NH_4)_2MoS_4$) was dissolved in deionized water to form a precursor solution. The $TiO_2$ support was impregnated with the metal precursor solution to achieve a suitable metal weight loading. The obtained wet powder was first dried in an oven at 100° C. overnight, followed by calcination at 350° C. in a nitrogen atmosphere for 2 hours with a nitrogen flow rate of 100 mL/min.

1 wt % Ga-5 wt % Ce/HZSM-5(23:1) catalyst (MAC2) was prepared in the following manner. An $NH_4$-ZSM-5 ($SiO_2$:$Al_2O_3$ molar ratio of 23:1) support structure in powder form obtained from Zeolyst USA was calcined in static air at 600° C. for 3 hours. The following metal salts were dissolved in deionized water to form a metal precursor solution: $Ce(NO_3)_3.6H_2O$ and $Ga(NO_3)_3.9H_2O$. The HZSM-5 support was impregnated with the metal precursor solution to achieve a suitable metal weight loading. The obtained wet powder was first dried in an oven at 100° C. overnight, followed by calcination at 550° C. for 4 hours in static air.

1 g dibenzothiophene (DBT), which is a model compound representing thiophenic sulfur species in diesel oil, was put in a 100 mL batch reactor. The 10 wt % Mo-1.25 wt % Ni—$TiO_2$—S catalyst and the 1 wt % Ga-5 wt % Ce/HZSM-5(23:1) catalyst were added and mechanical mixing was practiced. The reaction was carried out under 400° C. and a gas atmosphere of 32 atm $CH_4$ and 3 atm $N_2$. The weight ratio of DBT to each catalyst was 5:1 and the reaction lasted 1 hour. The gas product was collected in air bags, and the soluble product was extracted by solvent 1,1,2,2-tetrachloroethane and separated from the solid product through filtration. DBT conversion, methane conversion, gas yield, soluble yield, coke yield and overall mass balance were measured and listed in Table 1. Besides, the composition of gas products is listed in Table 2. Moreover, soluble products were also analyzed and the product distribution is listed in Table 3.

Example 11

10 wt % Mo-1.25 wt % Ni—$TiO_2$—S catalyst (MDS1) was prepared in the following manner. A $TiO_2$ (P25, average particle size 21 nm) support structure in powder form obtained from Sigma-Aldrich was used without further treatment. The metal salts nickel nitrate ($Ni(NO_3)_2.6H_2O$) and ammonium tetrathiomolybdate (($NH_4)_2MoS_4$) was dissolved in deionized water to form a precursor solution. The $TiO_2$ support was impregnated with the metal precursor solution to achieve a suitable metal weight loading. The obtained wet powder was first dried in an oven at 100° C. overnight, followed by calcination at 350° C. in a nitrogen atmosphere for 2 hours with a nitrogen flow rate of 100 mL/min.

1 wt % Ag-1 wt % Ga/HZSM-5(23:1) catalyst (MAC3) was prepared in the following manner. An $NH_4$-ZSM-5 ($SiO_2$:$Al_2O_3$ molar ratio of 23:1) support structure in powder form obtained from Zeolyst USA was calcined in static air at 600° C. for 3 hours. The following metal salts were dissolved in deionized water to form a metal precursor solution: $Ga(NO_3)_3.9H_2O$ and $AgNO_3$. The HZSM-5 support was impregnated with the metal precursor solution to achieve a suitable metal weight loading. The obtained wet powder was first dried in an oven at 100° C. overnight, followed by calcination at 550° C. for 4 hours in static air.

1 g dibenzothiophene (DBT), which is a model compound representing thiophenic sulfur species in diesel oil, was put in a 100 mL batch reactor. The 10 wt % Mo-1.25 wt % Ni—$TiO_2$—S catalyst and the 1 wt % Ag-1 wt % Ga/HZSM-5(23:1) catalyst were added and mechanical mixing was practiced. The reaction was carried out under 400° C. and a gas atmosphere of 32 atm $CH_4$ and 3 atm $N_2$. The weight ratio of DBT to each catalyst was 5:1 and the reaction lasted 1 hour. The gas product was collected in air bags, and the soluble product was extracted by solvent 1,1,2,2-tetrachloroethane and separated from the solid product through filtration. DBT conversion, methane conversion, gas yield, soluble yield, coke yield and overall mass balance were measured and listed in Table 1. Besides, the composition of gas products is listed in Table 2. Moreover, soluble products were also analyzed and the product distribution is listed in Table 3.

Example 12

10 wt % Mo-1.25 wt % Ni—$TiO_2$—S catalyst (MDS1) was prepared in the following manner. A $TiO_2$ (P25, average particle size 21 nm) support structure in powder form obtained from Sigma-Aldrich was used without further treatment. The metal salts nickel nitrate ($Ni(NO_3)_2.6H_2O$) and ammonium tetrathiomolybdate (($NH_4)_2MoS_4$) was dissolved in deionized water to form a precursor solution. The $TiO_2$ support was impregnated with the metal precursor solution to achieve a suitable metal weight loading. The obtained wet powder was first dried in an oven at 100° C. overnight, followed by calcination at 350° C. in a nitrogen atmosphere for 2 hours with a nitrogen flow rate of 100 mL/min.

1 wt % Ag-5 wt % Ce/HZSM-5(23:1) catalyst (MAC4) was prepared in the following manner. An $NH_4$-ZSM-5 ($SiO_2$:$Al_2O_3$ molar ratio of 23:1) support structure in powder form obtained from Zeolyst USA was calcined in static air at 600° C. for 3 hours. The following metal salts were dissolved in deionized water to form a metal precursor solution: $Ce(NO_3)_3.6H_2O$ and $AgNO_3$. The HZSM-5 support was impregnated with the metal precursor solution to achieve a suitable metal weight loading. The obtained wet powder was first dried in an oven at 100° C. overnight, followed by calcination at 550° C. for 4 hours in static air.

1 g dibenzothiophene (DBT), which is a model compound representing thiophenic sulfur species in diesel oil, was put in a 100 mL batch reactor. The 10 wt % Mo-1.25 wt % Ni—$TiO_2$—S catalyst and the 1 wt % Ag-5 wt % Ce/HZSM-5(23:1) catalyst were added and mechanical mixing was practiced. The reaction was carried out under 400° C. and a gas atmosphere of 32 atm $CH_4$ and 3 atm $N_2$. The weight ratio of DBT to each catalyst was 5:1 and the reaction lasted 1 hour. The gas product was collected in air bags, and the soluble product was extracted by solvent 1,1,2,2-tetrachloroethane and separated from the solid product through filtration. DBT conversion, methane conversion, gas yield, soluble yield, coke yield and overall mass balance were measured and listed in Table 1. Besides, the composition of gas products is listed in Table 2. Moreover, soluble products were also analyzed and the product distribution is listed in Table 3.

Example 13

10 wt % Mo-1.25 wt % Ni—$TiO_2$—S catalyst (MDS1) was prepared in the following manner. A $TiO_2$ (P25, average particle size 21 nm) support structure in powder form obtained from Sigma-Aldrich was used without further treatment. The metal salts nickel nitrate ($Ni(NO_3)_2.6H_2O$) and ammonium tetrathiomolybdate (($NH_4)_2MoS_4$) was dissolved in deionized water to form a precursor solution. The $TiO_2$ support was impregnated with the metal precursor solution to achieve a suitable metal weight loading. The obtained wet powder was first dried in an oven at 100° C. overnight, followed by calcination at 350° C. in a nitrogen atmosphere for 2 hours with a nitrogen flow rate of 100 mL/min.

1 wt % Ag-1 wt % Ga-5 wt % Ce/HZSM-5(23:1) catalyst (MAC1) was prepared in the following manner. An $NH_4$-ZSM-5 ($SiO_2$:$Al_2O_3$ molar ratio of 23:1) support structure in powder form obtained from Zeolyst USA was calcined in static air at 600° C. for 3 hours. The following metal salts were dissolved in deionized water to form a metal precursor solution: $Ce(NO_3)_3.6H_2O$, $Ga(NO_3)_3.9H_2O$ and $AgNO_3$. The HZSM-5 support was impregnated with the metal precursor solution to achieve a suitable metal weight loading. The obtained wet powder was first dried in an oven at 100° C. overnight, followed by calcination at 550° C. for 4 hours in static air.

1 g 4-methyldibenzothiophene (4-mDBT), which is a model compound representing thiophenic sulfur species in diesel oil, was put in a 100 mL batch reactor. The 10 wt % Mo-1.25 wt % Ni—$TiO_2$—S catalyst and the 1 wt % Ag-1 wt % Ga-5 wt % Ce/HZSM-5(23:1) catalyst were added and mechanical mixing was practiced. The reaction was carried out under 400° C. and a gas atmosphere of 32 atm $CH_4$ and 3 atm $N_2$. The weight ratio of 4-mDBT to each catalyst was 5:1 and the reaction lasted 1 hour. The gas product was collected in air bags, and the soluble product was extracted by solvent 1,1,2,2-tetrachloroethane and separated from the solid product through filtration. DBT conversion, methane conversion, gas yield, soluble yield, coke yield and overall mass balance were measured and listed in Table 1. Besides, the composition of gas products is listed in Table 2. Moreover, soluble products were also analyzed and the product distribution is listed in Table 3.

Example 14

10 wt % Mo-1.25 wt % Ni—$TiO_2$—S catalyst (MDS1) was prepared in the following manner. A $TiO_2$ (P25, average particle size 21 nm) support structure in powder form obtained from Sigma-Aldrich was used without further treatment. The metal salts nickel nitrate ($Ni(NO_3)_2.6H_2O$) and ammonium tetrathiomolybdate (($NH_4)_2MoS_4$) was dissolved in deionized water to form a precursor solution. The $TiO_2$ support was impregnated with the metal precursor solution to achieve a suitable metal weight loading. The obtained wet powder was first dried in an oven at 100° C. overnight, followed by calcination at 350° C. in a nitrogen atmosphere for 2 hours with a nitrogen flow rate of 100 mL/min.

1 wt % Ag-1 wt % Ga-5 wt % Ce/HZSM-5(23:1) catalyst (MAC1) was prepared in the following manner. An $NH_4$-ZSM-5 ($SiO_2$:$Al_2O_3$ molar ratio of 23:1) support structure in powder form obtained from Zeolyst USA was calcined in static air at 600° C. for 3 hours. The following metal salts were dissolved in deionized water to form a metal precursor solution: $Ce(NO_3)_3.6H_2O$, $Ga(NO_3)_3.9H_2O$ and $AgNO_3$. The HZSM-5 support was impregnated with the metal precursor solution to achieve a suitable metal weight loading. The obtained wet powder was first dried in an oven at 100° C. overnight, followed by calcination at 550° C. for 4 hours in static air.

1 g 4,6-dimethyldibenzothiophene (4,6-dmDBT), which is a model compound representing thiophenic sulfur species in diesel oil, was put in a 100 mL batch reactor. The 10 wt % Mo-1.25 wt % Ni—$TiO_2$—S catalyst and the 1 wt % Ag-1 wt % Ga-5 wt % Ce/HZSM-5(23:1) catalyst were added and mechanical mixing was practiced. The reaction was carried out under 400° C. and a gas atmosphere of 32 atm $CH_4$ and 3 atm $N_2$. The weight ratio of 4,6-dmDBT to each catalyst was 5:1 and the reaction lasted 1 hour. The gas product was collected in air bags, and the soluble product was extracted by solvent 1,1,2,2-tetrachloroethane and separated from the solid product through filtration. DBT conversion, methane conversion, gas yield, soluble yield, coke yield and overall mass balance were measured and listed in Table 1. Besides, the composition of gas products is listed in Table 2. Moreover, soluble products were also analyzed and the product distribution is listed in Table 3.

TABLE 1

Overall analysis results in Example 1-14

| Example | Catalyst | Gas | DBT conv. (%) | Gas yield (wt %) | Soluble yield (wt %) | Coke yield (wt %) | Overall mass balance (%) |
|---|---|---|---|---|---|---|---|
| 1 | MDS1 | 32 bar $CH_4$, 3 bar $N_2$ | 1.4 ± 0.6 | 2 ± 5 | 97 ± 5 | 1.3 ± 0.2 | 100 ± 5 |
| 2 | MAC1 | 32 bar $CH_4$, 3 bar $N_2$ | 6.5 ± 0.6 | 7 ± 5 | 90 ± 5 | 2.1 ± 0.2 | 99 ± 5 |
| 3 | MDS1 + MAC1 | 32 bar $CH_4$, 3 bar $N_2$ | 14.0 ± 0.6 | 2 ± 5 | 92 ± 5 | 4.8 ± 0.2 | 99 ± 5 |
| 4 | MDS1 + MAC1 | 35 bar $N_2$ | 8.3 ± 0.6 | 3 ± 5 | 94 ± 5 | 3.3 ± 0.2 | 100 ± 5 |
| 5 | SiC | 32 bar $CH_4$, 3 bar $N_2$ | 0.0 ± 0.6 | 1 ± 5 | 96 ± 5 | 0.0 ± 0.1 | 97 ± 5 |
| 6 | MDS1-O + MAC1 | 32 bar $CH_4$, 3 bar $N_2$ | 5.1 ± 0.6 | 8 ± 5 | 89 ± 5 | 2.8 ± 0.2 | 100 ± 5 |
| 7 | MDS2 + MAC1 | 32 bar $CH_4$, 3 bar $N_2$ | 9.2 ± 0.6 | 6 ± 5 | 90 ± 5 | 2.3 ± 0.2 | 98 ± 5 |
| 8 | MDS3 + MAC1 | 32 bar $CH_4$, 3 bar $N_2$ | 26.6 ± 0.6 | 2 ± 5 | 95 ± 5 | 2.5 ± 0.2 | 100 ± 5 |
| 9 | MDS4 + MAC1 | 32 bar $CH_4$, 3 bar $N_2$ | 10.8 ± 0.6 | 2 ± 5 | 95 ± 5 | 3.0 ± 0.2 | 100 ± 5 |
| 10 | MDS1 + MAC2 | 32 bar $CH_4$, 3 bar $N_2$ | 14.1 ± 0.6 | 3 ± 5 | 96 ± 5 | 3.5 ± 0.2 | 100 ± 5 |
| 11 | MDS1 + MAC3 | 32 bar $CH_4$, 3 bar $N_2$ | 13.5 ± 0.6 | 0 ± 5 | 94 ± 5 | 4.1 ± 0.2 | 98 ± 5 |
| 12 | MDS1 + MAC4 | 32 bar $CH_4$, 3 bar $N_2$ | 9.0 ± 0.6 | 4 ± 5 | 96 ± 5 | 2.4 ± 0.2 | 98 ± 5 |
| 13 | MDS1 + MAC1 | 32 bar $CH_4$, 3 bar $N_2$ | 6.9 ± 1.0 (4-mDBT) | 1 ± 5 | 92 ± 10 | 6.7 ± 0.2 | 100 ± 5 |
| 14 | MDS1 + MAC1 | 32 bar $CH_4$, 3 bar $N_2$ | 5.5 ± 1.5 (4,6-dmDBT) | 30 ± 50 | 46 ± 50 | 9.5 ± 2 | 95 ± 50 |

TABLE 2

Gas analysis of products in Example 1-14

| Example | Catalyst | Gas | $CH_4$ conv. (wt %) | $H_2$ yield (wt %) | C2 yield (wt %) | $CS_2$ yield (wt %) |
|---|---|---|---|---|---|---|
| 1 | MDS1 | 32 bar $CH_4$, 3 bar $N_2$ | 1.0 ± 1.0 | 0.07 ± 0.05 | 0 | 0 |
| 2 | MAC1 | 32 bar $CH_4$, 3 bar $N_2$ | 2.2 ± 1.0 | 0.10 ± 0.01 | 6.8 ± 1.0 | 0 |
| 3 | MDS1 + MAC1 | 32 bar $CH_4$, 3 bar $N_2$ | 1.4 ± 1.0 | 0.10 ± 0.03 | 1.1 ± 0.2 | 0 |
| 4 | MDS1 + MAC1 | 35 bar $N_2$ | N.A. | 0.05 ± 0.04 | 0 | 0 |
| 5 | SiC | 32 bar $CH_4$, 3 bar $N_2$ | 0.8 ± 1.0 | 0.06 ± 0.04 | 0 | 0 |
| 6 | MDS1-O + MAC1 | 32 bar $CH_4$, 3 bar $N_2$ | 2.4 ± 1.0 | 0.10 ± 0.01 | 6.2 ± 2.7 | 0 |
| 7 | MDS2 + MAC1 | 32 bar $CH_4$, 3 bar $N_2$ | 1.4 ± 1.0 | 0.21 ± 0.05 | 2.3 ± 0.4 | 0 |
| 8 | MDS3 + MAC1 | 32 bar $CH_4$, 3 bar $N_2$ | 2.0 ± 1.0 | 0.24 ± 0.06 | 1.6 ± 0.3 | 0 |
| 9 | MDS4 + MAC1 | 32 bar $CH_4$, 3 bar $N_2$ | 0.6 ± 1.0 | 0.09 ± 0.02 | 1.1 ± 0.2 | 0 |
| 10 | MDS1 + MAC2 | 32 bar $CH_4$, 3 bar $N_2$ | 1.6 ± 1.0 | 0.09 ± 0.01 | 1.0 ± 0.2 | 0 |
| 11 | MDS1 + MAC3 | 32 bar $CH_4$, 3 bar $N_2$ | 1.9 ± 1.0 | 0.10 ± 0.02 | 0.8 ± 0.2 | 0 |
| 12 | MDS1 + MAC4 | 32 bar $CH_4$, 3 bar $N_2$ | 0.1 ± 1.0 | 0.09 ± 0.02 | 0.3 ± 0.2 | 0 |
| 13 | MDS1 + MAC1 | 32 bar $CH_4$, 3 bar $N_2$ | 1.2 ± 1.0 | 0.17 ± 0.05 | 0.7 ± 0.2 | 0 |
| 14 | MDS1 + MAC1 | 32 bar $CH_4$, 3 bar $N_2$ | 0.9 ± 1.0 | 0.05 ± 0.02 | 0.9 ± 0.2 | 0 |

TABLE 3

Product yield distribution in Example 1-14, unit: wt %

| Example | C2 | $CS_2$ | Benzene | Toluene | Xylene | Bi phenyl | Other aromatics | High b.p. solubles | Coke | Total |
|---|---|---|---|---|---|---|---|---|---|---|
| 1 | 0 | 0 | 0 | 0.2 | 0 | 0 | 0 | 2.9 | 1.3 | 4.4 |
| 2 | 6.8 | 0 | 0.5 | 0.2 | 0 | 0 | 1.6 | 4.0 | 2.1 | 15.2 |
| 3 | 1.1 | 0.5 | 0.5 | 1.2 | 0.6 | 1.7 | 1.1 | 4.6 | 4.8 | 16.1 |
| 4 | 0 | 0 | 0.2 | 0.1 | 0 | 0.2 | 0 | 5.4 | 3.3 | 9.2 |
| 5 | 0 | 0 | 0 | 0 | 0 | 0 | 0 | 0 | 0 | 0 |
| 6 | 6.2 | 0 | 0.1 | 0.1 | 0 | 0.1 | 0.5 | 4.0 | 2.8 | 13.8 |
| 7 | 2.3 | 0.24 | 0.3 | 0.6 | 0.4 | 1.6 | 1.0 | 4.9 | 2.3 | 13.6 |
| 8 | 1.6 | Trace | 1.4 | 3.8 | 1.6 | 7.0 | 5.5 | 7.1 | 2.5 | 30.5 |
| 9 | 1.1 | 0.09 | 0.3 | 0.7 | 0.4 | 1.2 | 0.8 | 6.0 | 3.0 | 13.6 |
| 10 | 1.0 | 0.001 | 0.4 | 0.6 | 0.4 | 1.6 | 0.8 | 5.0 | 3.5 | 13.3 |

TABLE 3-continued

Product yield distribution in Example 1-14, unit: wt %

| Example | C2 | CS$_2$ | Benzene | Toluene | Xylene | Biphenyl | Other aromatics | High b.p. solubles | Coke | Total |
|---|---|---|---|---|---|---|---|---|---|---|
| 11 | 0.8 | Trace | 0.2 | 0.6 | 0.3 | 1.4 | 1.3 | 4.9 | 4.1 | 13.6 |
| 12 | 0.3 | 0 | 0 | 0.1 | 0 | 0.1 | 0.2 | 4.8 | 2.4 | 7.9 |
| 13 | 0.7 | 0.02 | 0.2 | 0.3 | 0.2 | 0.2 | 0.8 | 5.0 | 6.7 | 14.1 |
| 14 | 0.9 | 0 | 0.2 | 0.3 | 0.2 | 0.04 | 0.1 | 5.1 | 9.5 | 16.3 |

As indicated by the data provided in Tables 1, 2 and 3 (based upon Examples 1-14), the use of MDS catalyst structures (comprising Mo and Ni loaded in a TiSO$_2$—S support structure), MAC catalyst structures (comprising two or more of Ag, Ga and Ce loaded in an HZSM-5 support structure), and further combinations of MDS with MAC catalyst structures, provides effective DBT conversion as well as effective production of BTX and/or other desirable aromatic compounds, clearly indicating the effectiveness of such catalyst structures in the desulfurization of light oils and upgrading conversion into desirable end products.

Example 15

1 wt % Ag-1 wt % Ga-10 wt % Mo/HZSM-5(23:1) catalyst was prepared in the following manner. An NH$_4$-ZSM-5 (SiO$_2$:Al$_2$O$_3$ molar ratio of 23:1) support structure in powder form obtained from Zeolyst USA was calcined in static air at 600° C. for 3 hours. The following metal salts were dissolved in deionized water to form a metal precursor solution: AgNO$_3$, Ga(NO$_3$)$_3$.9H$_2$O and ((NH$_4$)$_6$Mo$_7$O$_{24}$.4H$_2$O. The HZSM-5 support was impregnated with the metal precursor solution to achieve a suitable metal weight loading. The obtained wet powder was first dried in an oven at 100° C. overnight, followed by calcination at 550° C. for 4 hours in static air.

1 g 1 wt % Ag-1 wt % Ga-10 wt % Mo/HZSM-5(23:1) catalyst was put in a 300 mL batch reactor together with 50 g marine diesel oil with continuous mechanical mixing. The reaction was carried out under 400° C. and a gas atmosphere of 30 atm CH$_4$ and 5 atm N$_2$. The weight ratio of feed to catalyst was 50:1 and the reaction lasted 1 hour. The liquid product was collected and liquid yield was calculated based on the feed. Meanwhile, the sulfur content in the liquid product was measured and the sulfur removal rate was calculated. The results were listed in Table 4.

Example 16

Shaped catalyst with the formula of 1 wt % Ag-1 wt % Ga-10 wt % Mo/HZSM-5(23:1) was prepared in the following manner. First, an NH$_4$-ZSM-5 (SiO$_2$:Al$_2$O$_3$ molar ratio of 23:1) support structure in powder form obtained from Zeolyst USA was calcined in static air at 600° C. for 3 hours. The zeolite was then extruded into pellet form with the following recipe: catalyst:colloidal silica:methylcellulose:acetic acid solution=1:0.5:0.2:0.1. After all components were added and suitably mixed, the extrusion was conducted with an extruder at room temperature. After extrusion, the wet catalyst pellets were dried at 95° C. overnight (e.g., about 8-12 hours), followed by calcination at 300° C. for 12 hours. The following metal salts were dissolved in deionized water to form a metal precursor solution: AgNO$_3$, Ga(NO$_3$)$_3$.9H$_2$O and ((NH$_4$)$_6$Mo$_7$O$_{24}$.4H$_2$O. The HZSM-5 support was impregnated with the metal precursor solution to achieve a suitable metal weight loading. The obtained wet powder was first dried in an oven at 100° C. overnight, followed by calcination at 550° C. for 4 hours in static air.

5 mL 1 wt % Ag-1 wt % Ga-10 wt % Mo/HZSM-5(23:1) catalyst was put in a small fixed bed reactor and marine diesel oil was used as the feed. The reaction was carried out under 400° C. and a gas atmosphere of 30 atm CH$_4$ and 5 atm N$_2$. The LHSV was controlled to be 1 h$^{-1}$ and the time on stream was set to be 6 h. After the reactor, the liquid product was collected and liquid yield was calculated based on the feed. Meanwhile, the sulfur content in the liquid product was measured and the sulfur removal rate was calculated. The results were listed in Table 4.

Example 17

1 wt % Ag-1 wt % Ga-10 wt % Mo/HZSM-5(23:1) catalyst was prepared in the following manner. An NH$_4$-ZSM-5 (SiO$_2$:Al$_2$O$_3$ molar ratio of 23:1) support structure in powder form obtained from Zeolyst USA was calcined in static air at 600° C. for 3 hours. The following metal salts were dissolved in deionized water to form a metal precursor solution: AgNO$_3$, Ga(NO$_3$)$_3$.9H$_2$O and ((NH$_4$)$_6$Mo$_7$O$_{24}$.4H$_2$O. The HZSM-5 support was impregnated with the metal precursor solution to achieve a suitable metal weight loading. The obtained wet powder was first dried in an oven at 100° C. overnight, followed by calcination at 550° C. for 4 hours in static air.

1 g catalyst was put in a 300 mL batch reactor together with 50 g marine diesel oil with continuous mechanical mixing. The reaction was carried out under 350° C. and a gas atmosphere of 50 atm natural gas. The weight ratio of feed to catalyst was 1:10 and the reaction lasted 1 hour. The liquid product was collected and liquid yield was calculated based on the feed. Meanwhile, the sulfur content in the liquid product was measured and the sulfur removal rate was calculated. The results were listed in Table 4.

Example 18

1 wt % Ag-1 wt % Ga-10 wt % Mo/HZSM-5(23:1) catalyst was prepared in the following manner. An NH$_4$-ZSM-5 (SiO$_2$:Al$_2$O$_3$ molar ratio of 23:1) support structure in powder form obtained from Zeolyst USA was calcined in static air at 600° C. for 3 hours. The following metal salts were dissolved in deionized water to form a metal precursor solution: AgNO$_3$, Ga(NO$_3$)$_3$.9H$_2$O and ((NH$_4$)$_6$Mo$_7$O$_{24}$.4H$_2$O. The HZSM-5 support was impregnated with the metal precursor solution to achieve a suitable metal weight loading. The obtained wet powder was first dried in an oven at 100° C. overnight, followed by calcination at 550° C. for 4 hours in static air.

1 g catalyst was put in a 300 mL batch reactor together with 50 g marine diesel oil with continuous mechanical mixing. The reaction was carried out under 450° C. and a gas atmosphere of 1 atm natural gas. The weight ratio of feed to catalyst was 50:1 and the reaction lasted 1 hour. The liquid product was collected and liquid yield was calculated based on the feed. Meanwhile, the sulfur content in the liquid product was measured and the sulfur removal rate was calculated. The results were listed in Table 4.

Example 19

Shaped catalyst with the formula of 1 wt % Ag-1 wt % Ga-10 wt % Mo/HZSM-5(23:1) was prepared in the following manner. First, an $NH_4$-ZSM-5 ($SiO_2$:$Al_2O_3$ molar ratio of 23:1) support structure in powder form obtained from Zeolyst USA was calcined in static air at 600° C. for 3 hours. The zeolite was then extruded into pellet form with the following recipe: catalyst:colloidal silica:methylcellulose: acetic acid solution=1:0.5:0.2:0.1. After all components were added and suitably mixed, the extrusion was conducted with an extruder at room temperature. After extrusion, the wet catalyst pellets were dried at 95° C. overnight (e.g., about 8-12 hours), followed by calcination at 300° C. for 12 hours. The following metal salts were dissolved in deionized water to form a metal precursor solution: $AgNO_3$, Ga$(NO_3)_3.9H_2O$ and $((NH_4)_6Mo_7O_{24}.4H_2O)$. The HZSM-5 support was impregnated with the metal precursor solution to achieve a suitable metal weight loading. The obtained wet powder was first dried in an oven at 100° C. overnight, followed by calcination at 550° C. for 4 hours in static air.

5 mL catalyst was put in a small fixed bed reactor and FCC diesel oil was used as the feed. The reaction was carried out under 400° C. and a gas atmosphere of 30 atm $CH_4$ and 5 atm $N_2$. The LHSV was controlled to be 0.1 $h^{-1}$ and the time on stream was set to be 6 h. After the reactor, the liquid product was collected and liquid yield was calculated based on the feed. Meanwhile, the sulfur content in the liquid product was measured and the sulfur removal rate was calculated. The results were listed in Table 4.

Example 20

Shaped catalyst with the formula of 1 wt % Ag-1 wt % Ga-10 wt % Mo/HZSM-5(23:1) was prepared in the following manner. First, an $NH_4$-ZSM-5 ($SiO_2$:$Al_2O_3$ molar ratio of 23:1) support structure in powder form obtained from Zeolyst USA was calcined in static air at 600° C. for 3 hours. The zeolite was then extruded into pellet form with the following recipe: catalyst:colloidal silica:methylcellulose: acetic acid solution=1:0.5:0.2:0.1. After all components were added and suitably mixed, the extrusion was conducted with an extruder at room temperature. After extrusion, the wet catalyst pellets were dried at 95° C. overnight (e.g., about 8-12 hours), followed by calcination at 300° C. for 12 hours. The following metal salts were dissolved in deionized water to form a metal precursor solution: $AgNO_3$, Ga$(NO_3)_3.9H_2O$ and $((NH_4)_6Mo_7O_{24}.4H_2O)$. The HZSM-5 support was impregnated with the metal precursor solution to achieve a suitable metal weight loading. The obtained wet powder was first dried in an oven at 100° C. overnight, followed by calcination at 550° C. for 4 hours in static air.

5 mL catalyst was put in a small fixed bed reactor and FCC gasoline oil was used as the feed. The reaction was carried out under 400° C. and a gas atmosphere of 30 atm $CH_4$ and 5 atm $N_2$. The LHSV was controlled to be 10 $h^{-1}$ and the time on stream was set to be 6 h. After the reactor, the liquid product was collected and liquid yield was calculated based on the feed. Meanwhile, the sulfur content in the liquid product was measured and the sulfur removal rate was calculated. The results were listed in Table 4.

Example 21

10 wt % Mo-1.25 wt % Ni—$TiO_2$—S catalyst (MDS1) was prepared in the following manner. A $TiO_2$ (P25, average particle size 21 nm) support structure in powder form obtained from Sigma-Aldrich was used without further treatment. The metal salts nickel nitrate ($Ni(NO_3)_2.6H_2O$) and ammonium tetrathiomolybdate ($(NH_4)_2MoS_4$) was dissolved in deionized water to form a precursor solution. The $TiO_2$ support was impregnated with the metal precursor solution to achieve a suitable metal weight loading. The obtained wet powder was first dried in an oven at 100° C. overnight, followed by calcination at 350° C. in a nitrogen atmosphere for 2 hours with a nitrogen flow rate of 100 mL/min.

1 wt % Ag-1 wt % Ga-5 wt % Ce/HZSM-5(23:1) (MAC1) catalyst was prepared in the following manner. An $NH_4$-ZSM-5 ($SiO_2$:$Al_2O_3$ molar ratio of 23:1) support structure in powder form obtained from Zeolyst USA was calcined in static air at 600° C. for 3 hours. The following metal salts were dissolved in deionized water to form a metal precursor solution: $Ce(NO_3)_3.6H_2O$, $Ga(NO_3)_3.9H_2O$ and $AgNO_3$. The HZSM-5 support was impregnated with the metal precursor solution to achieve a suitable metal weight loading. The obtained wet powder was first dried in an oven at 100° C. overnight, followed by calcination at 550° C. for 4 hours in static air.

0.2 g MDS1 catalyst and 0.2 g MAC1 catalyst were put in a 100 mL batch reactor together with 2 g marine diesel oil. The reaction was carried out under 400° C. with continuous mechanical mixing and a gas atmosphere of 30 atm $CH_4$ and 5 atm $N_2$. The weight ratio of feed to catalyst was 10:1 and the reaction lasted 1 hour. The liquid product was collected and liquid yield was calculated based on the feed. Meanwhile, the sulfur content in the liquid product was measured and the sulfur removal rate was calculated. The results were listed in Table 4.

Example 22

10 wt % Mo-1.25 wt % Ni—$TiO_2$—S catalyst (MDS1) was prepared in the following manner. A $TiO_2$ (P25, average particle size 21 nm) support structure in powder form obtained from Sigma-Aldrich was used without further treatment. The metal salts nickel nitrate ($Ni(NO_3)_2.6H_2O$) and ammonium tetrathiomolybdate ($(NH_4)_2MoS_4$) was dissolved in deionized water to form a precursor solution. The $TiO_2$ support was impregnated with the metal precursor solution to achieve a suitable metal weight loading. The obtained wet powder was first dried in an oven at 100° C. overnight, followed by calcination at 350° C. in a nitrogen atmosphere for 2 hours with a nitrogen flow rate of 100 mL/min.

1 wt % Ag-1 wt % Ga-5 wt % Ce/HZSM-5(23:1) (MAC1) catalyst was prepared in the following manner. An $NH_4$-ZSM-5 ($SiO_2$:$Al_2O_3$ molar ratio of 23:1) support structure in powder form obtained from Zeolyst USA was calcined in static air at 600° C. for 3 hours. The following metal salts were dissolved in deionized water to form a metal precursor solution: $Ce(NO_3)_3.6H_2O$, $Ga(NO_3)_3.9H_2O$ and $AgNO_3$. The HZSM-5 support was impregnated with the metal precursor solution to achieve a suitable metal weight loading. The obtained wet powder was first dried in an oven at 100° C. overnight, followed by calcination at 550° C. for 4 hours in static air.

0.2 g MDS1 catalyst and 0.2 g MAC1 catalyst were put in a 100 mL batch reactor together with 2 g renewable diesel oil. The reaction was carried out under 400° C. with continuous mechanical mixing and a gas atmosphere of 30 atm $CH_4$ and 5 atm $N_2$. The weight ratio of feed to catalyst was 10:1 and the reaction lasted 1 hour. The liquid product was collected and liquid yield was calculated based on the feed. Meanwhile, the sulfur content in the liquid product was measured and the sulfur removal rate was calculated. The results were listed in Table 4.

Example 23

10 wt % Mo-1.25 wt % Ni—$TiO_2$—S catalyst (MDS1) was prepared in the following manner. A $TiO_2$ (P25, average particle size 21 nm) support structure in powder form obtained from Sigma-Aldrich was used without further treatment. The metal salts nickel nitrate ($Ni(NO_3)_2.6H_2O$) and ammonium tetrathiomolybdate (($NH_4)_2MoS_4$) was dissolved in deionized water to form a precursor solution. The $TiO_2$ support was impregnated with the metal precursor solution to achieve a suitable metal weight loading. The obtained wet powder was first dried in an oven at 100° C. overnight, followed by calcination at 350° C. in a nitrogen atmosphere for 2 hours with a nitrogen flow rate of 100 mL/min.

1 wt % Ag-1 wt % Ga-5 wt % Ce/HZSM-5(23:1) (MAC1) catalyst was prepared in the following manner. An $NH_4$-ZSM-5 ($SiO_2:Al_2O_3$ molar ratio of 23:1) support structure in powder form obtained from Zeolyst USA was calcined in static air at 600° C. for 3 hours. The following metal salts were dissolved in deionized water to form a metal precursor solution: $Ce(NO_3)_3.6H_2O$, $Ga(NO_3)_3.9H_2O$ and $AgNO_3$. The HZSM-5 support was impregnated with the metal precursor solution to achieve a suitable metal weight loading. The obtained wet powder was first dried in an oven at 100° C. overnight, followed by calcination at 550° C. for 4 hours in static air.

0.2 g MDS1 catalyst and 0.2 g MAC1 catalyst were put in a 100 mL batch reactor together with 2 g heavy crude oil. The reaction was carried out under 400° C. with continuous mechanical mixing and a gas atmosphere of 30 atm $CH_4$ and 5 atm $N_2$. The weight ratio of feed to catalyst was 10:1 and the reaction lasted 1 hour. The liquid product was collected and liquid yield was calculated based on the feed. Meanwhile, the sulfur content in the liquid product was measured and the sulfur removal rate was calculated. The results were listed in Table 4.

Example 24

10 wt % Mo-1.25 wt % Ni—$TiO_2$—S catalyst (MDS1) was prepared in the following manner. A $TiO_2$ (P25, average particle size 21 nm) support structure in powder form obtained from Sigma-Aldrich was used without further treatment. The metal salts nickel nitrate ($Ni(NO_3)_2.6H_2O$) and ammonium tetrathiomolybdate (($NH_4)_2MoS_4$) was dissolved in deionized water to form a precursor solution. The $TiO_2$ support was impregnated with the metal precursor solution to achieve a suitable metal weight loading. The obtained wet powder was first dried in an oven at 100° C. overnight, followed by calcination at 350° C. in a nitrogen atmosphere for 2 hours with a nitrogen flow rate of 100 mL/min.

1 wt % Ag-1 wt % Ga-5 wt % Ce/HZSM-5(23:1) (MAC1) catalyst was prepared in the following manner. An $NH_4$-ZSM-5 ($SiO_2:Al_2O_3$ molar ratio of 23:1) support structure in powder form obtained from Zeolyst USA was calcined in static air at 600° C. for 3 hours. The following metal salts were dissolved in deionized water to form a metal precursor solution: $Ce(NO_3)_3.6H_2O$, $Ga(NO_3)_3.9H_2O$ and $AgNO_3$. The HZSM-5 support was impregnated with the metal precursor solution to achieve a suitable metal weight loading. The obtained wet powder was first dried in an oven at 100° C. overnight, followed by calcination at 550° C. for 4 hours in static air.

0.2 g MDS1 catalyst and 0.2 g MAC1 catalyst were put in a 100 mL batch reactor together with 2 g coker naphtha. The reaction was carried out under 400° C. with continuous mechanical mixing and a gas atmosphere of 30 atm $CH_4$ and 5 atm $N_2$. The weight ratio of feed to catalyst was 10:1 and the reaction lasted 1 hour. The liquid product was collected and liquid yield was calculated based on the feed. Meanwhile, the sulfur content in the liquid product was measured and the sulfur removal rate was calculated. The results were listed in Table 4.

Example 25

10 wt % Mo-1.25 wt % Ni—$TiO_2$—S catalyst (MDS1) was prepared in the following manner. A $TiO_2$ (P25, average particle size 21 nm) support structure in powder form obtained from Sigma-Aldrich was used without further treatment. The metal salts nickel nitrate ($Ni(NO_3)_2.6H_2O$) and ammonium tetrathiomolybdate (($NH_4)_2MoS_4$) was dissolved in deionized water to form a precursor solution. The $TiO_2$ support was impregnated with the metal precursor solution to achieve a suitable metal weight loading. The obtained wet powder was first dried in an oven at 100° C. overnight, followed by calcination at 350° C. in a nitrogen atmosphere for 2 hours with a nitrogen flow rate of 100 mL/min.

1 wt % Ag-1 wt % Ga-5 wt % Ce/HZSM-5(23:1) (MAC1) catalyst was prepared in the following manner. An $NH_4$-ZSM-5 ($SiO_2:Al_2O_3$ molar ratio of 23:1) support structure in powder form obtained from Zeolyst USA was calcined in static air at 600° C. for 3 hours. The following metal salts were dissolved in deionized water to form a metal precursor solution: $Ce(NO_3)_3.6H_2O$, $Ga(NO_3)_3.9H_2O$ and $AgNO_3$. The HZSM-5 support was impregnated with the metal precursor solution to achieve a suitable metal weight loading. The obtained wet powder was first dried in an oven at 100° C. overnight, followed by calcination at 550° C. for 4 hours in static air.

0.2 g MDS1 catalyst and 0.2 g MAC1 catalyst were put in a 100 mL batch reactor together with 2 g coker naphtha. The reaction was carried out under 400° C. with continuous mechanical mixing and a gas atmosphere of 35 atm $N_2$. The weight ratio of feed to catalyst was 10:1 and the reaction lasted 1 hour. The liquid product was collected and liquid yield was calculated based on the feed. Meanwhile, the sulfur content in the liquid product was measured and the sulfur removal rate was calculated. The results were listed in Table 4.

Example 26

A commercial silicon carbide (SiC) from Sigma-Aldrich with a specific surface area of 10 $m^2/g$ was used as the catalyst without further purification. 0.2 g SiC catalyst was put in a 100 mL batch reactor together with 2 g coker naphtha. The reaction was carried out under 400° C. with continuous mechanical mixing and a gas atmosphere of 30 atm $CH_4$ and 5 atm $N_2$. The weight ratio of feed to catalyst was 10:1 and the reaction lasted 1 hour. The liquid product was collected and liquid yield was calculated based on the feed. Meanwhile, the sulfur content in the liquid product was measured and the sulfur removal rate was calculated. The results were listed in Table 4.

Example 27

10 wt % Mo-1.25 wt % Ni—$TiO_2$—S catalyst (MDS1) was prepared in the following manner. A $TiO_2$ (P25, average particle size 21 nm) support structure in powder form obtained from Sigma-Aldrich was used without further treatment. The metal salts nickel nitrate ($Ni(NO_3)_2.6H_2O$) and ammonium tetrathiomolybdate (($NH_4)_2MoS_4$) was dissolved in deionized water to form a precursor solution. The $TiO_2$ support was impregnated with the metal precursor solution to achieve a suitable metal weight loading. The obtained wet powder was first dried in an oven at 100° C. overnight, followed by calcination at 350° C. in a nitrogen atmosphere for 2 hours with a nitrogen flow rate of 100 mL/min.

1 wt % Ag-1 wt % Ga-5 wt % Ce/HZSM-5(23:1) (MAC1) catalyst was prepared in the following manner. An $NH_4$-ZSM-5 ($SiO_2:Al_2O_3$ molar ratio of 23:1) support structure in powder form obtained from Zeolyst USA was calcined in static air at 600° C. for 3 hours. The following metal salts were dissolved in deionized water to form a metal precursor solution: $Ce(NO_3)_3.6H_2O$, $Ga(NO_3)_3.9H_2O$ and $AgNO_3$. The HZSM-5 support was impregnated with the metal precursor solution to achieve a suitable metal weight loading. The obtained wet powder was first dried in an oven at 100° C. overnight, followed by calcination at 550° C. for 4 hours in static air.

2.1 mL MDS1 catalyst and 2.1 mL MAC1 catalyst were put in a fixed bed reactor and coker naphtha was used as the feed. The reaction was carried out under 400° C. and a gas atmosphere of 30 atm $CH_4$ and 5 atm $N_2$. The LHSV was controlled to be 1 $h^{-1}$ and the time on stream was set to be 72 h. After the reactor, the liquid product was collected and liquid yield was calculated based on the feed. Meanwhile, the sulfur content in the liquid product was measured and the sulfur removal rate (removal degree, e.g., percentage of the amount of sulfur removed based upon the amount of sulfur in the original composition) was calculated. The results are listed in Table 4.

TABLE 4

Overall analysis results in Example 15-27

| Example | Catalyst | Feed | Reactor | Gas atmosphere | Sulfur removal degree (%) | Liquid yield (wt%) |
|---|---|---|---|---|---|---|
| 15 | 1 wt % Ag-1 wt % Ga-10 wt % Mo/ZSM-5 | Marine diesel oil | Batch | 30 atm $CH_4$ + 5 atm $N_2$ | 62 | 98 |
| 16 | 1 wt % Ag-1 wt % Ga-10 wt % ± Mo/ZSM-5 | Marine diesel oil | Fixed bed | 30 atm $CH_4$ + 5 atm $N_2$ | 78 | 96 |
| 17 | 1 wt ± Ag-1 wt ± Ga-10 wt % ± Mo/ZSM-5 | Marine diesel oil | Batch | 50 atm natural gas | 58 | 91 |
| 18 | 1 wt % ± Ag-1 wt % Ga-10 wt % ± Mo/ZSM-5 | Marine diesel oil | Batch | 1 atm natural gas | 65 | 97 |
| 19 | 1 wt % Ag-1 wt % Ga-10 wt ± Mo/Z S M-5 | FCC diesel | Fixed bed | 30 atm $CH_4$ + 5 atm $N_2$ | 74 | 91 |
| 20 | 1 wt % Ag-1 wt % Ga-10 wt ± Mo/ZSM-5 | FCC gasoline | Fixed bed | 30 atm $CH_4$ + 5 atm $N_2$ | 52 | 94 |
| 21 | MDS1 + MAC1 | Marine diesel oil | Batch | 30 atm $CH_4$ + 5 atm $N_2$ | 32 | 79 |
| 22 | MDS1 + MAC1 | Renewable diesel oil | Batch | 30 atm $CH_4$ + 5 atm $N_2$ | 56 | 67 |
| 23 | MDS1 + MAC1 | Heavy crude oil | Batch | 30 atm $CH_4$ + 5 atm $N_2$ | 61 | 93 |
| 24 | MDS1 + MAC1 | Coker naphtha | Batch | 30 atm $CH_4$ + 5 atm $N_2$ | 98 | 73 |
| 25 | MDS1 + MAC1 | Coker naphtha | Batch | 35 atm $N_2$ | 87 | 70 |
| 26 | SiC | Coker naphtha | Batch | 30 atm $CH_4$ + 5 atm $N_2$ | 33 | 81 |
| 27 | MDS1 + MAC1 | Coker naphtha | Fixed bed | 30 atm $CH_4$ + 5 atm $N_2$ | 60 | 60 |

The data presented in Table 4 (based upon Examples 15-27) clearly shows the effectiveness of utilizing combinations of MDS and MAC catalyst structures or catalyst structures comprising Ag, Ga and Mo loaded in an HZSM-5 support structure with regard to desulfurization/sulfur removal from light oils.

It is evident that the sulfur-containing species can be effectively converted to valuable products including benzene, xylene, toluene and other aromatics with the presence of methane environment and catalyst structure disclosed in the embodiments. In addition, a new sulfur-containing product $CS_2$ can be formed, which is not observed in hydrodesulfurization processes. Therefore, the methods and catalyst structures described herein provide an alternative way for the oil desulfurization process, which is innovative and transformational in the petroleum industry.

While the invention has been described in detail and with reference to specific embodiments thereof, it will be apparent to one skilled in the art that various changes and modifications can be made therein without departing from the spirit and scope thereof. Thus, it is intended that the present invention covers the modifications and variations of this invention provided they come within the scope of the appended claims and their equivalents.

What is claimed:

1. A method for the desulfurization of a sulfur-containing hydrocarbon feedstock, the method comprising introducing the sulfur-containing feedstock within a reactor in the presence of a gas atmosphere and a catalyst structure, wherein the catalyst structure comprises a porous support structure that comprises an aluminosilicate material including at least the following metals located in the aluminosilicate material:
   silver and gallium, or
   gallium and cerium, or
   silver, gallium and cerium, or
   silver, gallium and molybdenum;
   wherein the gas atmosphere consists of pure gas or a mixture of gases selected from the group consisting of nitrogen, helium, methane, and natural gas.

2. The method of claim 1, wherein the sulfur-containing feedstock comprises light oils containing sulfur or compounds selected from the group consisting of thiophene, benzothiophene, dibenzothiophene and any combination and/or derivatives thereof.

3. The method of claim 1, wherein each metal loaded in the porous support structure is present in an amount from about 0.1 wt % to about 20 wt % based upon the total weight of the catalyst structure.

4. The method of claim 3 wherein the metals are loaded within the porous support structure in the form of one or more of the following salts: chlorides, nitrates, sulfates, sulfides and polythiometalates.

5. The method of claim 1, wherein the catalyst structure comprises the following metals loaded in the aluminosilicate material at the following weight percentages:
   1 wt % silver, 1 wt % gallium, and 5 wt % cerium; or
   1 wt % gallium and 5 wt % cerium; or
   1 wt % silver and 1 wt % gallium.

6. The method of claim 1, wherein the catalyst structure further comprises a titanium oxide material including molybdenum and nickel loaded in the titanium oxide material.

7. The method of claim 1, wherein the catalyst structure further comprises a titanium oxide material having the following metals loaded in the titanium oxide material at the following weight percentages: 10 wt % molybdenum and 1.25 wt % nickel.

8. The method of claim 1, wherein the reactor comprises one or a combination of a batch reactor system, a continuous tubular reactor (CTR), and a semi-batch reactor.

9. The method of claim 1, wherein the following conditions are present in the reactor: a reaction temperature within the range of about 350° C. to about 450° C., and a pressure within the range of about 1 atm and about 50 atm.

10. The method of claim 1, wherein the reactor comprises a batch reactor, and a mass ratio of sulfur-containing feedstock to catalyst structure within the reactor is within the range of about 50:1 to about 1:10.

11. The method of claim 1, wherein the reactor comprises a continuous reactor, and a liquid hourly space velocity (LHSV) of the sulfur-containing feedstock is within the range of about $0.1\ h^{-1}$ to about $10\ h^{-1}$.

12. The method of claim 1, further comprising forming a plurality of products within the reactor, the plurality of products comprising carbon disulfide, benzene, toluene and xylenes.

13. A method for the desulfurization of a sulfur-containing hydrocarbon feedstock, the method comprising introducing the sulfur-containing feedstock within a reactor in the presence of a gas atmosphere and a catalyst structure, wherein the catalyst structure comprises an aluminosilicate material including silver, gallium and molybdenum loaded in the aluminosilicate material.

14. The method of claim 13, wherein the aluminosilicate material includes the following metals loaded in the porous support structure at the following weight percentages: 1 wt % silver, 1 wt % gallium, and 10 wt % molybdenum.

* * * * *